US009037488B1

(12) United States Patent
Kerpel

(10) Patent No.: US 9,037,488 B1
(45) Date of Patent: May 19, 2015

(54) SYSTEM AND METHOD OF CREATING ELECTRONIC RECORDS AND CORRESPONDING PHYSICAL SIGNAGE

(75) Inventor: Martin D. Kerpel, Highland Park, IL (US)

(73) Assignee: Renaissance Properties, LLC., Chicago, IL (US)

( * ) Notice: Subject to any disclaimer, the term of this patent is extended or adjusted under 35 U.S.C. 154(b) by 374 days.

(21) Appl. No.: 13/420,277

(22) Filed: Mar. 14, 2012

(51) Int. Cl.
*G06Q 30/00* (2012.01)
*G06Q 30/02* (2012.01)
*G06Q 50/16* (2012.01)

(52) U.S. Cl.
CPC ............ *G06Q 30/0241* (2013.01); *G06Q 50/16* (2013.01)

(58) Field of Classification Search
CPC ... G06Q 50/16; G06Q 30/02; G06Q 30/0241; G06F 17/3087; G06F 17/30241
USPC .......................................... 705/7.34; 715/764
See application file for complete search history.

(56) References Cited

U.S. PATENT DOCUMENTS

| | | | |
|---|---|---|---|
| 4,870,576 A | 9/1989 | Tornetta | |
| 5,032,989 A | 7/1991 | Tornetta | |
| 5,862,325 A * | 1/1999 | Reed et al. | 709/201 |
| 6,636,803 B1 | 10/2003 | Hartz, Jr. et al. | |
| 6,985,926 B1 | 1/2006 | Ferlauto et al. | |
| 7,016,866 B1 * | 3/2006 | Chin et al. | 705/26.7 |
| 7,076,448 B1 * | 7/2006 | Snyder | 705/26.62 |
| 7,747,636 B1 | 6/2010 | Price et al. | |
| 7,882,094 B2 | 2/2011 | Winslow | |
| 8,140,399 B1 * | 3/2012 | Goel | 705/26.1 |
| 8,423,548 B1 * | 4/2013 | Trandal et al. | 707/736 |
| 2002/0095454 A1 * | 7/2002 | Reed et al. | 709/201 |
| 2002/0198760 A1 | 12/2002 | Carpenter et al. | |
| 2004/0015399 A1 * | 1/2004 | Maggio | 705/14 |
| 2004/0103032 A1 * | 5/2004 | Maggio | 705/14 |
| 2004/0138912 A1 | 7/2004 | Campbell | |
| 2005/0043971 A1 * | 2/2005 | Hendrickson et al. | 705/4 |
| 2005/0060232 A1 * | 3/2005 | Maggio | 705/14 |
| 2005/0171837 A1 * | 8/2005 | Eglinton | 705/14 |
| 2005/0171838 A1 * | 8/2005 | Eglinton | 705/14 |
| 2005/0187832 A1 * | 8/2005 | Morse et al. | 705/27 |
| 2006/0026136 A1 * | 2/2006 | Drucker et al. | 707/3 |
| 2006/0080114 A1 * | 4/2006 | Bakes et al. | 705/1 |
| 2006/0117625 A1 * | 6/2006 | Peterson | 40/611.01 |
| 2006/0129458 A1 * | 6/2006 | Maggio | 705/14 |
| 2006/0143083 A1 * | 6/2006 | Wedeen | 705/14 |
| 2006/0143220 A1 * | 6/2006 | Spencer, Jr. | 707/102 |

(Continued)

OTHER PUBLICATIONS

Rahm, Erhard, and Hong Hai Do. "Data cleaning: Problems and current approaches." IEEE Data Eng. Bull. 23.4 (2000): 3-13.*

(Continued)

*Primary Examiner* — Gurkanwaljit Singh
(74) *Attorney, Agent, or Firm* — Perry Hoffman

(57) ABSTRACT

Systems and methods of using electronic records and corresponding physical signage for advertising and marketing an item are defined. A user input interface is used to create electronic records that define the advertised and marketed item. A database communicates with the user input interface and stores one or more electronic records. A record comparer compares electronic records and limits the number of records that relate to the same item using a prioritization schema and a limit identifier. A code generator generates an electronic code associated with a single record. A sign generator creates an electronic sign and an output system reproduces a physical version of the electronic sign.

20 Claims, 17 Drawing Sheets

(56) References Cited

U.S. PATENT DOCUMENTS

| | | | |
|---|---|---|---|
| 2006/0184374 A1 | 8/2006 | Long | |
| 2006/0190279 A1* | 8/2006 | Heflin | 705/1 |
| 2006/0218003 A1* | 9/2006 | Snyder | 705/1 |
| 2006/0247969 A1* | 11/2006 | Yates | 705/14 |
| 2007/0050276 A1* | 3/2007 | Mannion | 705/35 |
| 2007/0276746 A1* | 11/2007 | Michonski | 705/37 |
| 2008/0010365 A1* | 1/2008 | Schneider | 709/223 |
| 2008/0104531 A1* | 5/2008 | Stambaugh | 715/771 |
| 2008/0126170 A1 | 5/2008 | Leck et al. | |
| 2008/0177994 A1* | 7/2008 | Mayer | 713/2 |
| 2008/0255931 A1* | 10/2008 | Kosho et al. | 705/14 |
| 2009/0171699 A1* | 7/2009 | Langford et al. | 705/4 |
| 2009/0259547 A1* | 10/2009 | Clopp | 705/14.16 |
| 2009/0271307 A1* | 10/2009 | Brock, Sr. | 705/35 |
| 2009/0319166 A1* | 12/2009 | Khosravy et al. | 701/200 |
| 2010/0015584 A1* | 1/2010 | Singer et al. | 434/236 |
| 2011/0218934 A1* | 9/2011 | Elser | 705/36 R |
| 2011/0289009 A1 | 11/2011 | Rankin, Jr. et al. | |
| 2011/0289010 A1 | 11/2011 | Rankin, Jr. et al. | |
| 2012/0197685 A1* | 8/2012 | Mays et al. | 705/7.34 |
| 2012/0246084 A1* | 9/2012 | Marshall | 705/313 |

OTHER PUBLICATIONS

Bilenko, Mikhail, and Raymond J. Mooney. "Adaptive duplicate detection using learnable string similarity measures." Proceedings of the ninth ACM SIGKDD international conference on Knowledge discovery and data mining. ACM, 2003.*

Elmagarmid, Ahmed K., Panagiotis G. Ipeirotis, and Vassilios S. Verykios. "Duplicate record detection: A survey." Knowledge and Data Engineering, IEEE Transactions on 19.1 (2007): 1-16.*

* cited by examiner

FIG. 2B

PADPoster

Posting a Listing

Continue adding apartment information for
1234 N. Roadway, 2W Chicago IL, 60000

Description

Primary Features/Amenities
- ☒ Hardwood Floors
- ☐ Granite countertop
- ☐ Intercom
- ☐ Parking
- ☐ Stainless Steel Appliances
- ☐ Fireplace
- ☐ Description Box
- ☐ Dishwasher
- ☐ Eat-In Kitchen
- ☒ Laundry On-Site
- ☐ Garbage Disposal
- ☐ Balcony, Deck, Patio
- ☐ Laundry In-Unit

Additonal Features/Amenities
- ☐ Microwave
- ☐ Parking Extra
- ☐ Dining room
- ☐ Loft layout
- ☐ Dogs Allowed
- ☐ Managed by Owner
- ☐ Wheelchair access
- ☐ Sauna
- ☐ Golf course
- ☐ High-speed Internet Included
- ☐ Doorman
- ☐ Heat Included
- ☐ Office/Den
- ☐ Parking Space
- ☐ Breakfast nook
- ☐ Condo Unit
- ☐ Yard
- ☐ Fitness center
- ☐ Clubhouse
- ☐ Parking Included
- ☐ Pet Policy
- ☐ Family room
- ☐ Parking Garage
- ☐ Basement
- ☐ Single-Family Home
- ☐ Swimming pool
- ☐ Business center
- ☐ Guest parking
- ☐ Intercom System
- ☐ Central Air
- ☐ Walk-in closet
- ☐ Cats Allowed
- ☐ Storage space(s)
- ☐ Elevator
- ☐ Jacuzzi/Whirlpool
- ☐ Tennis court(s)
- ☐ Cable TV included

[Back] [Continue]

Posting Position

1234 N Roadway, 2W
Chicago, IL 60000
1 Bedroom, 1 Bath
$1200 per month
Availabity March ©2012 PADPoster.com. All Rights Reserved. PadPoster.com is a Renaissance Properties company.
Privacy Policy | Terms of Use | Disclaimer

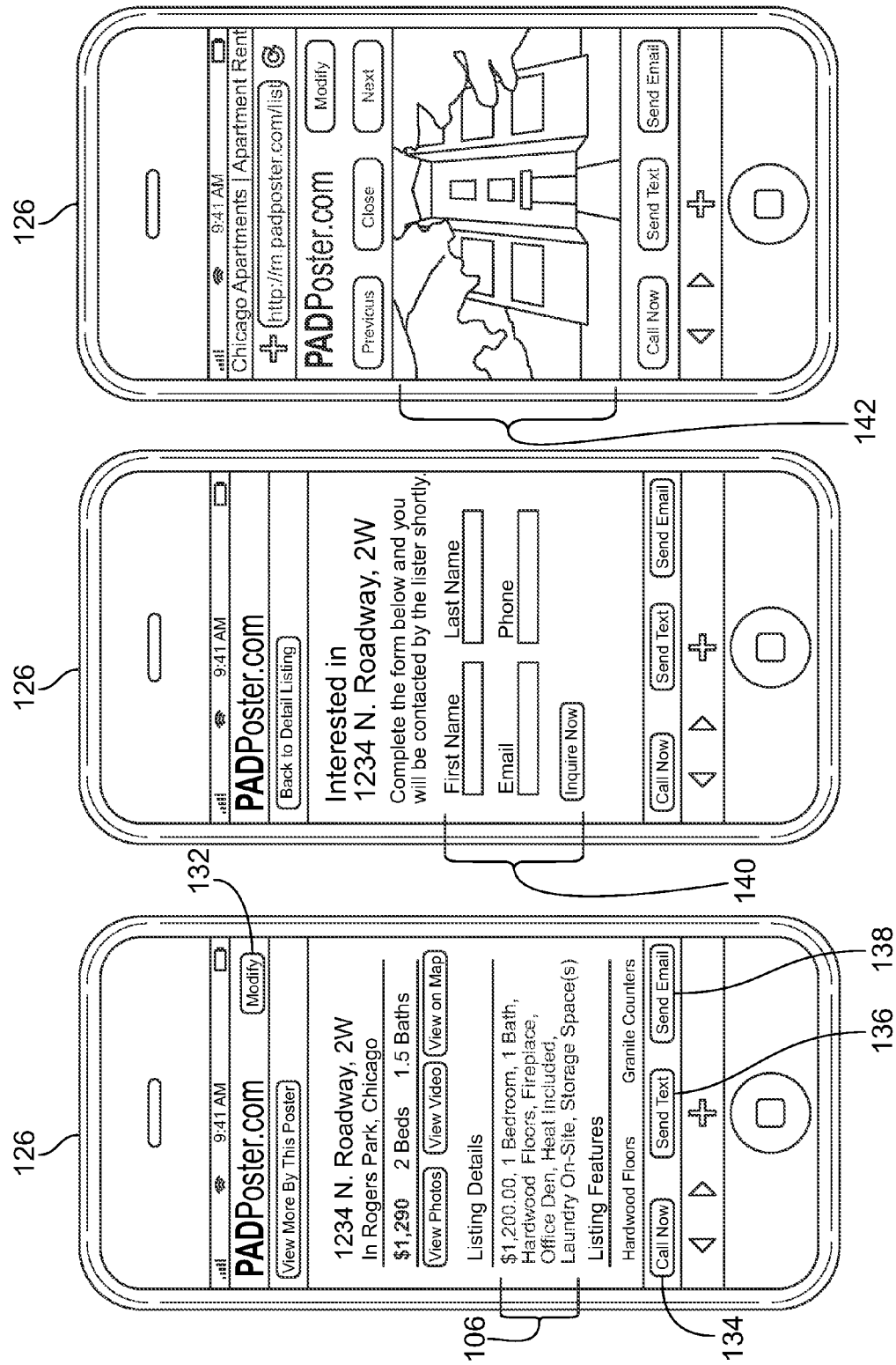

SYSTEM AND METHOD OF CREATING ELECTRONIC RECORDS AND CORRESPONDING PHYSICAL SIGNAGE

FIELD OF THE INVENTION

The present invention relates generally to creating electronic records and physical signage associated with the electronic records, and more particularly to storing the electronic records in a database, generating electronic codes corresponding to the electronic records, and outputting physical signage containing data from an electronic record and a physical version of the corresponding electronic code in a user defined layout where a user can control limitations and prioritization of duplicate electronic records. For example, in one embodiment, a landlord wishing to advertise and market a rental property may create an electronic record through a user interface for storage in a database where the data entered by the landlord describes the rental property and where an electronic code is generated to correspond to the property described in the electronic record. The landlord may then output a "For Rent" sign with data describing the rental property, such as text and pictures, and a physical version of the electronic code, such as a QR code or other one-dimensional or two-dimensional barcodes, in a format that the landlord chooses. A prospective tenant may then use a mobile electronic device, such as a smartphone, to take a picture of the code and access a website relating to the rental property. The website may contain text, graphic and video information relating to the property for display to the prospective tenant. The system administrator may limit the number of duplicate rental listings to a specific number and prioritize whose listing will have preference.

BACKGROUND OF THE INVENTION

One of the most effective lead generators for apartment rentals comes from "For Rent" signs on buildings. Tenants know to look for rental signs on buildings and landlords know to post rental signs. Moreover, the characteristics of the surrounding neighborhood are, and always will be, an important consideration for people looking to rent an apartment. Prospective renters will continue to travel through neighborhoods when planning to rent and will continue to be exposed to rental signs as they do so. Thus, "For Rent" signs will always be a great means to advertise and market rental properties. Rental signs can also be a good source for a landlord to provide information to prospective tenants. However, the amount of information that a landlord can put on a rental sign is limited.

Other existing methods of marketing and advertising apartments allow landlords to provide more information about the property to prospective tenants than can fit on a sign. A landlord may: 1) hire a broker to list with a Multiple Listing Service (MLS); 2) pay for an ad online or in a newspaper; or 3) use a free internet based service to list their apartment. However, these methods also have limitations.

First, a hired broker who lists apartments in an MLS is typically engaged as the exclusive broker for that property. The broker is paid when the apartment is rented, even if another broker brought the actual tenant to the transaction. Brokers pay to be members of an MLS and must abide by its rules. One of the rules for an MLS limits the number of postings that may be made for a particular property to only one. Listings must also be complete. They must include an address for the property, the number of bedrooms, the number of bathrooms and the square footage, along with other information. The information in MLS systems is generally very reliable. The MLS monitors the information and the brokers to ensure compliance with the rules. Those who violate the rules are subject to fines and may ultimately have their accounts suspended. Consequently, landlords who want to lease their property must pay a commission. Those who do not want to pay a commission are not allowed to use the MLS.

Second, landlords will often pay to run ads in the newspaper or on some internet sites, however, while the landlords are able to list as many ads as they wish, they must pay for each one. The required payment limits the number of ads that are placed for a single property.

Third, the popularity of the internet has provided a new mechanism for marketing and advertising rental properties by using websites to post listings for free. For example, craigslist.com (Craigslist) has become the dominant site for listing and searching for apartments in many markets and is representative of the prior art of websites used to market rental properties. Craigslist allows users to post ads for free in most markets, and numerous landlords and third-party rental agents use this website. However, Craigslist and other websites have two major problems: 1) they allow multiple postings of the same apartment on the website without reasonable limitations; and 2) they do not have an effective search method. Craigslist tries to prevent an individual from posting more than one ad for the same apartment. However, its attempts have been unsuccessful. Many individuals use multiple email addresses and slightly different descriptions to post multiple ads for the same apartment. Further, many different rental agencies market the same apartment. Each agent in the agency can post multiple times for the same apartment. A single apartment will often have twenty postings at a time and can easily have one hundred. Craigslist has been unable to stop these multiple postings, and it makes the website very difficult to use. Also, Craigslist does not have an effective search method. Searches are done by keyword, number of bedrooms, rent and pet policy. This is not an effective way for prospective tenants to locate a desired apartment because these are the only search criteria. One cannot search by a particular neighborhood, a particular block in a neighborhood or a particular feature other than those mentioned, such as air conditioning, etc. Also, Craigslist does not require the results of a search to be related to a particular address and it cannot return results in a mapped format. It is especially difficult with so many duplicate postings. The large number of duplicate postings has made Craigslist virtually unusable in large urban areas. As such, the internet, rather than making it easier to rent an apartment, has actually made it more difficult.

While these means of marketing and advertising apartments can provide more information to prospective tenants, they do not allow one to have instant access to all available information about a property while traveling through a particular neighborhood in an easy to use format without the problems associated with duplicate data.

Although the prior art has involved various ways to manage property related information and to display that information to an end user, the prior art does not include systems and methods for creating electronic records and physical signage associated with the electronic records to market and advertise properties in a way that limits the duplication of records in the databases to make property searching easy for the prospective renter. For example, U.S. Pat. No. 6,636,803, issued to Hartz, Jr. et al., for "Real-Estate Information Search and Retrieval System" relates to a search and retrieval system including a data terminal that displays icons representing properties in a given real-estate market on a digital map. The icons are selectable so that, when selected, information derived from an MLS or other database is displayed in association with the map. In one embodiment, the data terminal is equipped with a GPS receiver and data-enabled mobile phone. The GPS receiver receives location data which is used by a processor to display an icon representing a current location of the terminal within the map. The data-enabled phone links the terminal to a remote server or database of property information, which may also be displayed when property icons are selected on the map. The property information may include media data to provide a visual depiction of the property icons selected.

U.S. Pat. No. 7,747,636, issued to Price et al., for "System for Providing Information to Local Real Estate Purchaser" relates to a real estate point of sale system with optical indicia on a sign. One at the point of sale may capture the indicia using the camera on a portable phone. Information from the picture is sent to a server, and used to retrieve and return information about the property.

United States Patent Application number 2011/0289009 by Rankin, J R. et al., for "Apparatuses, Methods and Systems for an Activity Tracking and Property Transaction Facilitating Hub" relates to contact management apparatuses, methods and systems that facilitate the generation, evaluation, and recording of information and activities related to property transactions and associated communications. A property marketing tool may be configured to generate marketing materials such as web pages, PDF documents, flyers and/or other printed documents or to generate a one dimensional or two dimensional barcode and/or the like, the scanning of which may cause the automatic linking of a mobile electronic device to a webpage displaying property information. United States Patent Application number 2011/0289010 by Rankin, J R. et al., for "Apparatuses, Methods and Systems for an Activity Tracking and Property Transaction Facilitating Hub User Interface" relates to customizable mapping of spatiotemporal information in an integrated customer relationship management and real estate listing system with optimized scheduling of activities and/or appointments, access to and display of contact information and dynamic sorting and filtering of searchable data and also discloses the marketing tool described above.

While the prior art reveals apparatuses, systems and methods for the entry, retrieval and display of real estate related information on a mobile electronic device in response to scanning a code on a sign, the prior art does not reveal systems or methods of controlling the duplication of data to prevent such duplication from affecting system performance and ease of use. Accordingly, it would be desirable to improve the end user experience by controlling the duplication of data to prevent such duplication from affecting system performance and ease of use and to allow the duplication of data when such duplication may enhance the end user experience and not affect system performance and ease of use. The inventions discussed in connection with the described embodiment address these and other deficiencies of the prior art.

The features and advantages of the present inventions will be explained in or apparent from the following description of the preferred embodiment considered together with the accompanying drawings.

SUMMARY OF THE INVENTION

The present inventions address the deficiencies of the prior art of using electronic records and corresponding physical signage to advertise and market an item. Systems and methods are defined that employ a user input interface to create electronic records that define the advertised and marketed item. A database is used in communication with the user input interface to store one or more of the electronic records created with the user input interface. A record comparer in communication with the user input interface and the database is used to compare electronic records. The record comparer accepts user input instructing whether or not to limit the number of electronic records that relate to the same item. If the record comparer is instructed to limit the number of electronic records, it does so based on a prioritization schema and a limit identifier. These limitations controlled by the record comparer and the limit identifier are not known to exist in the prior art. A code generator in communication with the database generates an electronic code associated with a single record in the database. A sign generator in communication with the database and the code generator is used to create an electronic sign, which includes an electronic record from the database, the electronic code associated with the electronic record from the database, and user defined content and layout information in electronic form. An output system is used to reproduce a physical version of the electronic sign that includes a combination of a physical version of the electronic record from the database, a physical version of the electronic code associated with the electronic record of the database and a physical version of the user defined content and layout information.

In one embodiment, a mobile electronic device having a display and a camera is used to capture an image of the physical version of the electronic code. A first application in the mobile electronic device translates the image of the physical version of the electronic code into an electronic identifier that identifies the electronic record in the database associated with the electronic code. A second application in the mobile electronic device communicates with the first application by taking the electronic identifier as input and outputting content from the electronic record onto the display.

In some embodiments, the electronic record may include text, audio, still images and video wherein the original of the media is stored as a field in the electronic record. The electronic code may be a matrix barcode, such as a QR code or other similar type of code, and the electronic address may be an internet address so that when the physical version of the electronic code is scanned by the mobile device, a webpage displaying information from the electronic record about the marketed and advertised item is shown on the display of the mobile electronic device. In some embodiments, a third application on the mobile electronic device may be used to translate space-based satellite navigation system data, such as GPS data or latitude/longitude data, into an electronic identifier that identifies the electronic record in the database relating to the nearest item.

Further embodiments define the user input interface to allow duplication of an electronic record with a single user input signal and also to allow access and editing of a single field in the electronic record with a single user input signal. Some embodiments include a search engine that allows a user of the mobile electronic device to search the database based on user-selectable criteria.

In a specific embodiment applied to rental apartments as the advertised and marketed item, the electronic records may contain an apartment listing with data such as text, graphics, audio and video that show and describe the apartment with the original media stored as a field in the electronic record. These records are stored in the database. In some systems that show rental apartments, duplicated data may make the system cumbersome and difficult to use. Thus, the user input interface may be used to instruct the record comparer to limit the number of electronic records that describe a single rental property to some number that is one or greater, this number being the limit identifier. The prioritization schema may be used to limit the number of electronic records used based on a title, such as "agent", "broker" or "landlord", although all electronic records may be stored. For example, in a system limited to one electronic record per rental property, if an agent, a broker and a landlord all create an electronic record for the same property, the system may be used to give the landlord a preference over the broker and the agent and use the landlord's electronic record, and if two agents provide the only listings, then the electronic record created earliest may be selected. Again, these limitations controlled by the record comparer and the limit identifier are not known to exist in the prior art. The code generator generates a code, such as a QR code, that relates to an electronic record describing the landlord's property. The landlord may use the user input interface to enter content describing the apartment and to layout or choose a style for a "For Rent" sign. The output subsystem is used to print the rental sign and to include the QR code and whatever else the landlord has put on the sign, such as pictures and text.

In the rental property related embodiment, a prospective tenant with a mobile electronic device, such as a smartphone, may have applications running in the smartphone that allow him or her to scan the QR code from the rental sign and display a website showing the landlord's rental apartment.

In one rental property related embodiment, property listings may be duplicated and a single click may be used to reach a field for editing. For example, the user input interface may allow a landlord to get to a screen to manage listings and edit the rental price with a single click of the mouse and simply type the new price. Similarly, a landlord may duplicate a listing with a single click and then click on the duplicated listing to view several fields describing the apartment, such as, "pets allowed" or "heat included", where editing can be accomplished by typing or selecting fields with an input device like a mouse. In some embodiments, the landlord or other person creating the listing may use an address checking subsystem that validates the address using a commercial address validation service, such as that used by the United States Post Office and that indicates whether or not an address is valid. To monitor bad data, a database filter may be used to flag electronic records with an indication that an address is invalid. In some embodiments, electronic records may be created using data from a Multiple Listing Service (MLS) or other Real Estate Transaction Standard (RETS) data. In some embodiments, a prospective tenant may use a third application on the smartphone that translates space-based satellite navigation system data, such as GPS data or latitude/longitude data, into an electronic identifier that identifies the electronic record in the database relating to the nearest rental apartment. The applications on the smartphone may also include a search engine that allows a prospective tenant to search the database of listings based on user-selectable criteria to view a list of available rentals with the chosen criteria.

BRIEF DESCRIPTION OF THE DRAWINGS

The inventions will now be more particularly described by way of example with reference to the accompanying drawings. Novel features believed characteristic of the inventions are set forth in the claims. The inventions themselves, as well as the preferred mode of use, further objectives, and advantages thereof, are best understood by reference to the following detailed description of the embodiment in conjunction with the accompanying drawings, in which:

FIG. 2B shows a data entry form for entering general apartment characteristics as part of an electronic record.

FIG. 2C shows a data entry form for entering specific apartment characteristics as part of an electronic record.

FIG. 2D shows a data entry form for entering media as part of an electronic record.

FIG. 2E shows a data entry form for entering contact information as part of an electronic record.

FIG. 6D shows the physical output of text from an electronic record on a webpage as displayed on a mobile electronic device.

FIG. 6E shows a data entry form for entering contact information on a mobile electronic device.

FIG. 6F shows the physical output of a photo from an electronic record on a webpage as displayed on a mobile electronic device.

DETAILED DESCRIPTION OF THE EMBODIMENTS

Figure 1A:
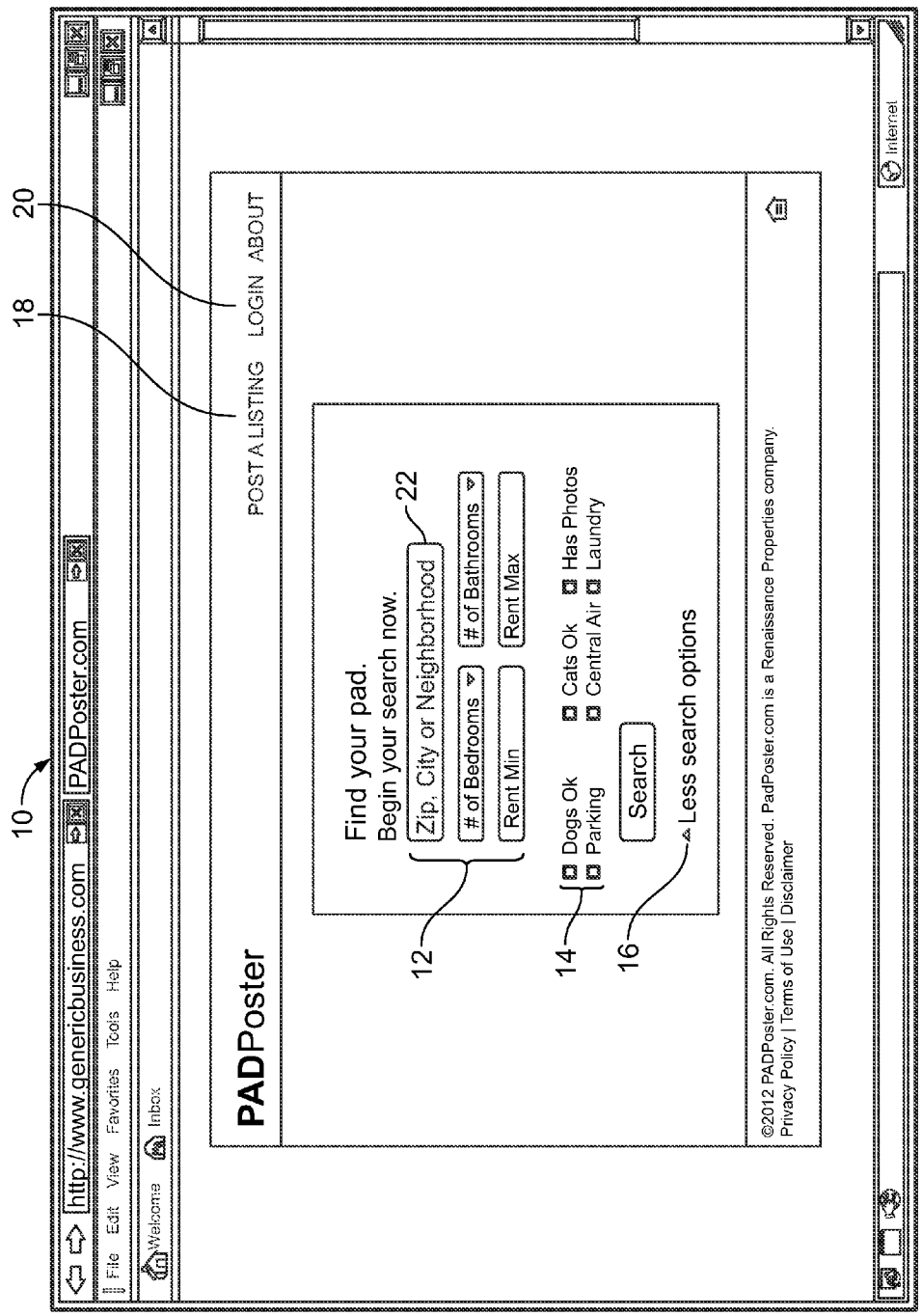
FIG. 1A shows a starting user interface for choosing to create an electronic record and for searching the database.

The described embodiment is a system and method for listing and searching rental properties. Landlords, brokers, and agents may create easily editable, reusable listings that are stored in a database as electronic records that define the rental property. A code generator communicates with the database to generate an electronic code associated with a rental property. In the described embodiment, the electronic code is a QR code or some similar code. After the electronic code is created, a sign generator communicates with the code generator and the database to create an electronic sign, which contains an electronic record from the database, an electronic code, and user defined content and layout information. The electronic sign is then converted to a physical "For Rent" sign that contains physical versions of the components of the electronic sign. The result is a traditional "For Rent" sign enhanced with user defined descriptions of the property with photos and a QR code on the sign that the landlord, agent, or broker may display on the property or at a location where prospective tenants will be looking to rent the property.

Prospective tenants who have a smart phone or some other similar device that has a display, camera and resident applications may encounter the "For Rent" sign and scan the QR code or other electronic code. A first application on the smartphone will translate the scanned image of the electronic code into an electronic identifier that identifies the electronic record in the database associated with the electronic code. A second application communicates with the first application by taking the electronic identifier as input and outputting contents from the electronic record onto the display of the smartphone. In other words, a prospective tenant who encounters and is interested in a property described on a "For Rent" sign that has a QR code may take a picture of the QR code and have a website dedicated to advertising and marketing the particular rental property appear on the display of the smartphone. Once the prospective tenant accesses the website, he or she has a great deal of information about the available property, including the ability to take a virtual tour and see relevant contact information.

Because the type of database described may demonstrate degraded performance and affect the ease with which an end user may use the system when the use of duplicate data is unrestricted, the described embodiment has a record comparer that communicates with the user input interface and the database and that compares electronic records. The record comparer accepts user input instructing whether or not to limit the number of electronic records that relate to the same rental property using a prioritization schema and a limit identifier that limits the number of electronic records according to the prioritization schema and the limit identifier. That is, the record comparer may be used to limit the number of listings used for a particular property to one or more records in the database, although all listings will be stored in the database. Additionally, when more than one electronic records are created for use in the database that are associated with the same rental property, a prioritization schema is used to determine whose record gets displayed. For example, if a landlord, a real estate broker and a real estate agent all create electronic records defining the same property and the limit identifier is 1, then the prioritization schema is used to determine whose listing gets displayed when accessed. The landlord may have priority over the broker, and the broker may have priority over the agent. Thus, the landlord's listing will be displayed from the database. In one described embodiment, if two brokers create listings for the same property, the listing created earlier may have priority.

The above-described systems and methods may be described using the aforementioned figures. FIG. 1A shows a starting user interface 10 for choosing to create an electronic record defining a rental property and for searching the database. The prospective tenant may begin his or her search by entering general property criteria 12, wherein the general location of the property 22 may be selected by entering a ZIP code, a city name or a neighborhood name within a metropolitan area. Once the general location of the property 22 is chosen, the prospective tenant may enter the remaining general property criteria 12, which includes number of bedrooms, number of bathrooms, minimum rent and maximum rent. More search options 14 may be chosen to narrow the search. The more search options 14 may be removed from the screen by clicking on the less search options 16 selection. While more search options 14 shown include whether dogs and cats are allowed, whether the website offers photos of the property and whether central air, parking and laundry are available, other options may be available, and greater or fewer options may be listed.

FIG. 1A also shows the post listing selection 18 and the login selection 20. A landlord, broker, agent or other person who wishes to post a listing may click on the post listing selection 18 to start the process of advertising and marketing a property using the described embodiment. In the described embodiment, one may begin to list a property whether or not that person already has an account with the service provider. If one already has an account, one may select the login selection 20 to post further listings or to manage already posted listings.

Figure 1B:
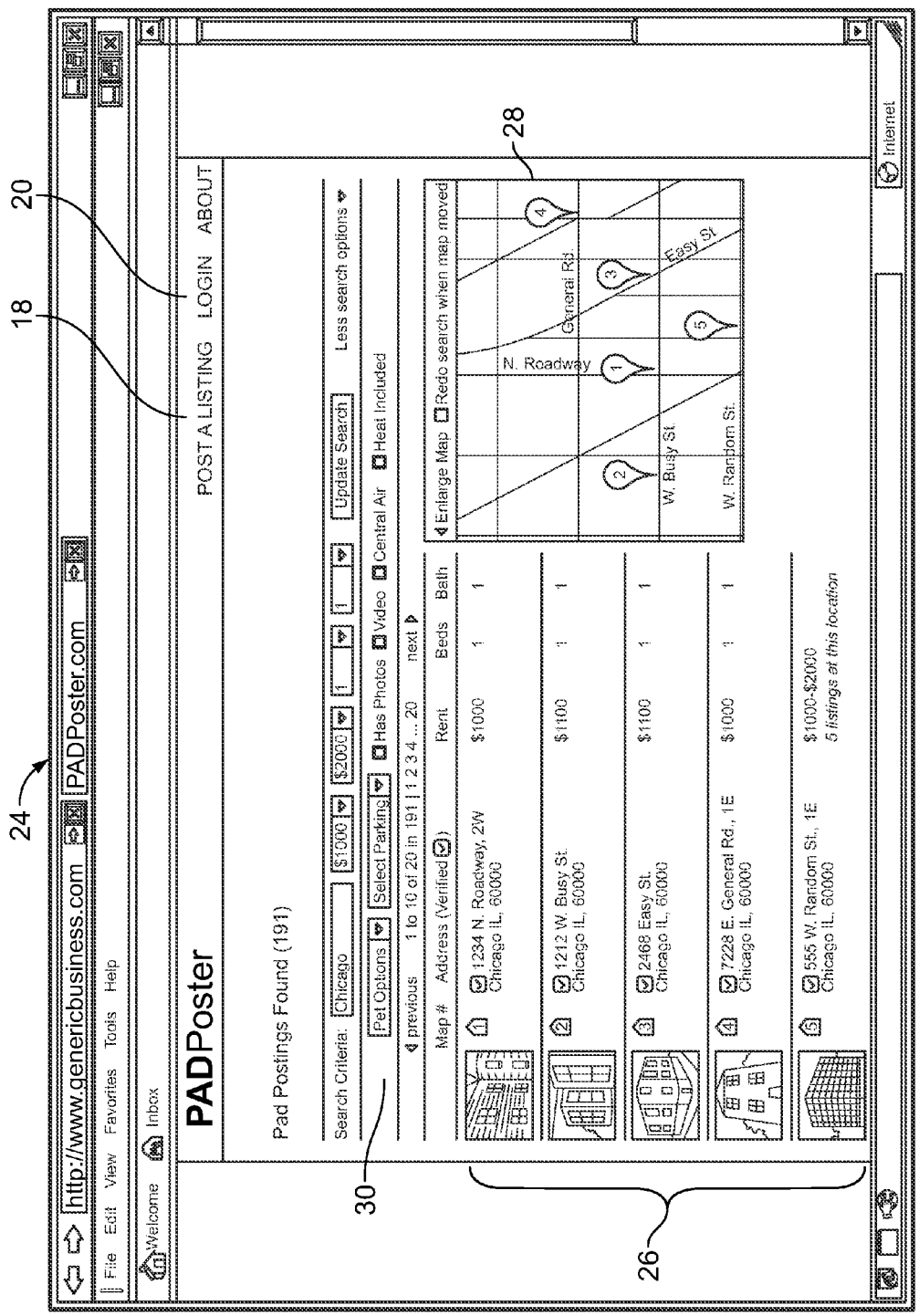
FIG. 1B shows a search results screen for a search of the database.

FIG. 1B shows a search results screen 24 for a search of the database. The search results screen 24 includes the search results list 26 and a search results map 28. The search results list 26 shows a line by line list of rental apartments that fit the criteria chosen when performing a search from the starting user interface 10. Each line of the search results list 26 shows a photo of the building, if available, the position of the listing in the list, the address of the property, the rent, the number of bedrooms and the number of bathrooms. Next to the search results list 26, a search results map 28 is displayed. The search results map 28 shows the locations of the listed properties that fit the search criteria on a two-dimensional map. A searcher may broaden or narrow the terms of the search by selecting or unselecting items listed in the search results options 30. In the described embodiment, the post listing selection 18 and the login selection 20 are available from the search results screen 24. In the case of a building that has multiple apartments for rent, a single line of the search results will explain the availability of multiple apartments. If this line is selected, the next screen appearing will show each apartment as a separate line.

Figure 1C:
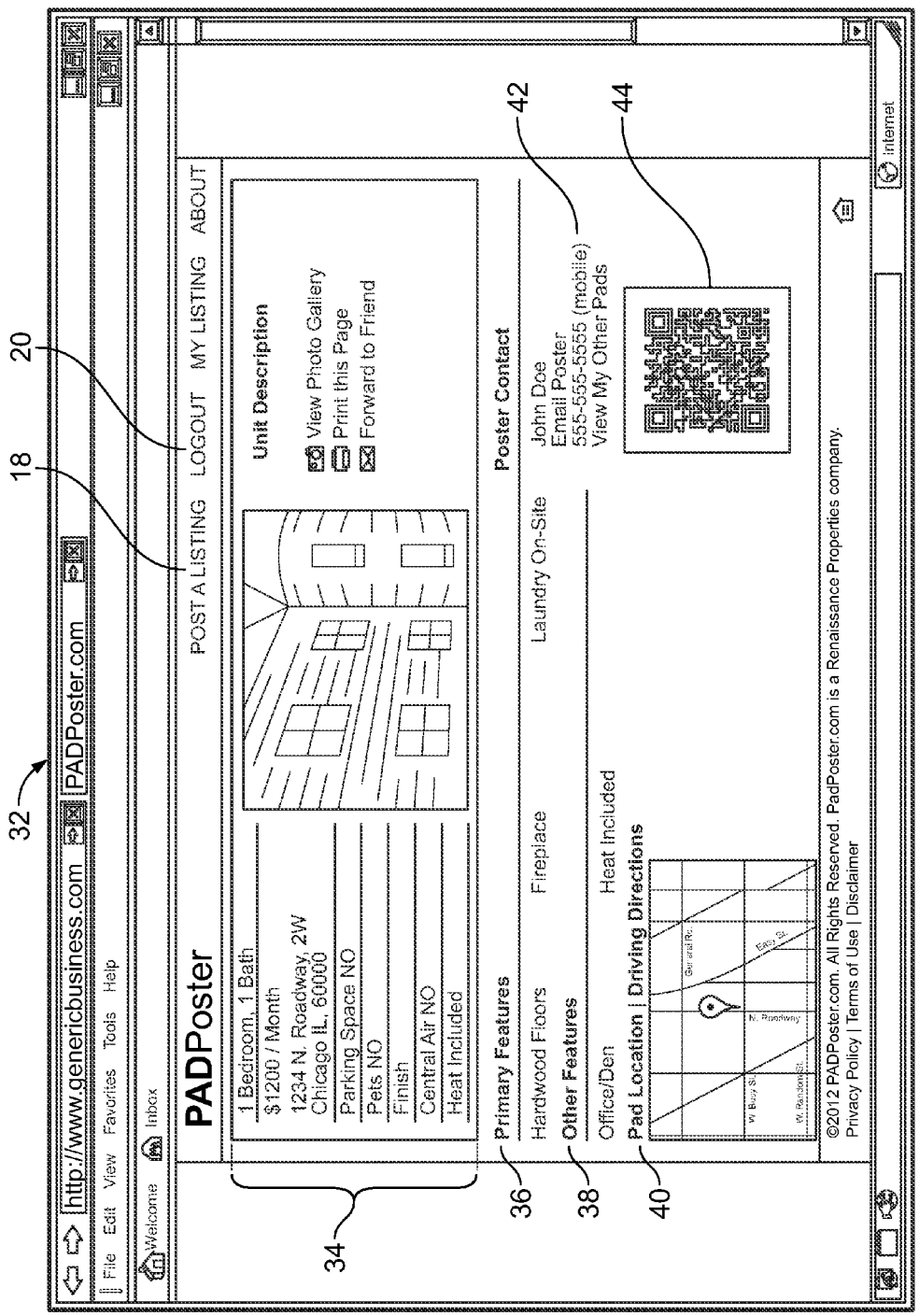
FIG. 1C shows the physical output of an electronic record on a webpage.

FIG. 1C shows the physical output of an electronic record on a webpage 32. This layout shows information for a specific property on the search results list 26. In this layout, general listing information 34, primary features 36, other features 38 and a map with driving directions 40 are displayed. Other embodiments may show other layouts. Also included in the physical output of an electronic record on a webpage 32 are contact information 42 and a QR code 44 that is associated with the particular property. Within the general listing information 34, the prospective tenant may view a photo gallery, print the web page and forward the web page address to a friend. If the prospective tenant selects the map with driving directions 40, a new screen or window will appear with textual and/or graphic driving directions. The contact information 42 is that of the person who posted the listing, usually a landlord, agent or broker. The QR code 44 is associated with a web page so that when the prospective tenant scans or takes a picture of the QR code 44 with a smartphone, a web page advertising and marketing the rental property will appear on the smartphone. In some embodiments, the QR code 44 may be selected with a mouse or other similar device on the physical output of an electronic record on a webpage 32, and the prospective tenant will be redirected to a web page dedicated to the rental property. In the described embodiment, the post listing selection 18 and the login selection 20 are available from this screen.

Figure 2A:
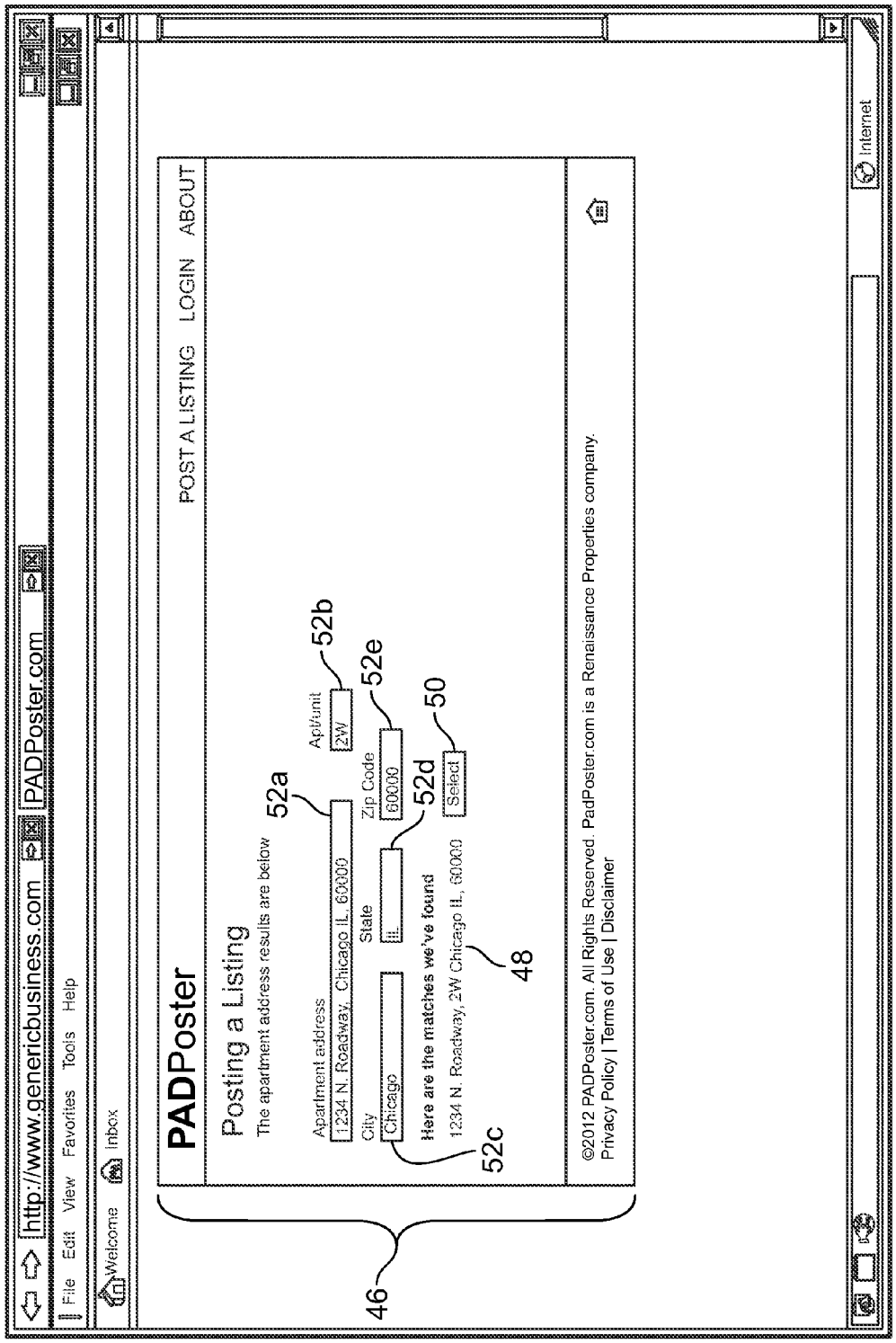
FIG. 2A shows a data entry form for entering an address as part of an electronic record.

The next several figures demonstrate the process for creating an electronic record to be stored in the database in the described embodiment as a listing for a rental property. After one selects the post listing selection 18, a data entry screen appears for entry of the address of the desired posting. Once the address is entered, the poster can select a "Lookup" button to validate that the address is a legitimate address. This validation may be processed using Experian's™ QAS system, the United State Post Office's Delivery Point Validation (DPV™) system, or any other similar address validation system. FIG. 2A shows a validated address screen 46, which displays a validated address 48 in uniform address format after validation. If multiple formats for the same address are acceptable, those addresses will appear in list format under the text stating, "Here are the matches we've found." If the address shown is acceptable to the listing poster, the data in the address text boxes 52a-e are added to an electronic record for later storage in the database.

Figure 2B:
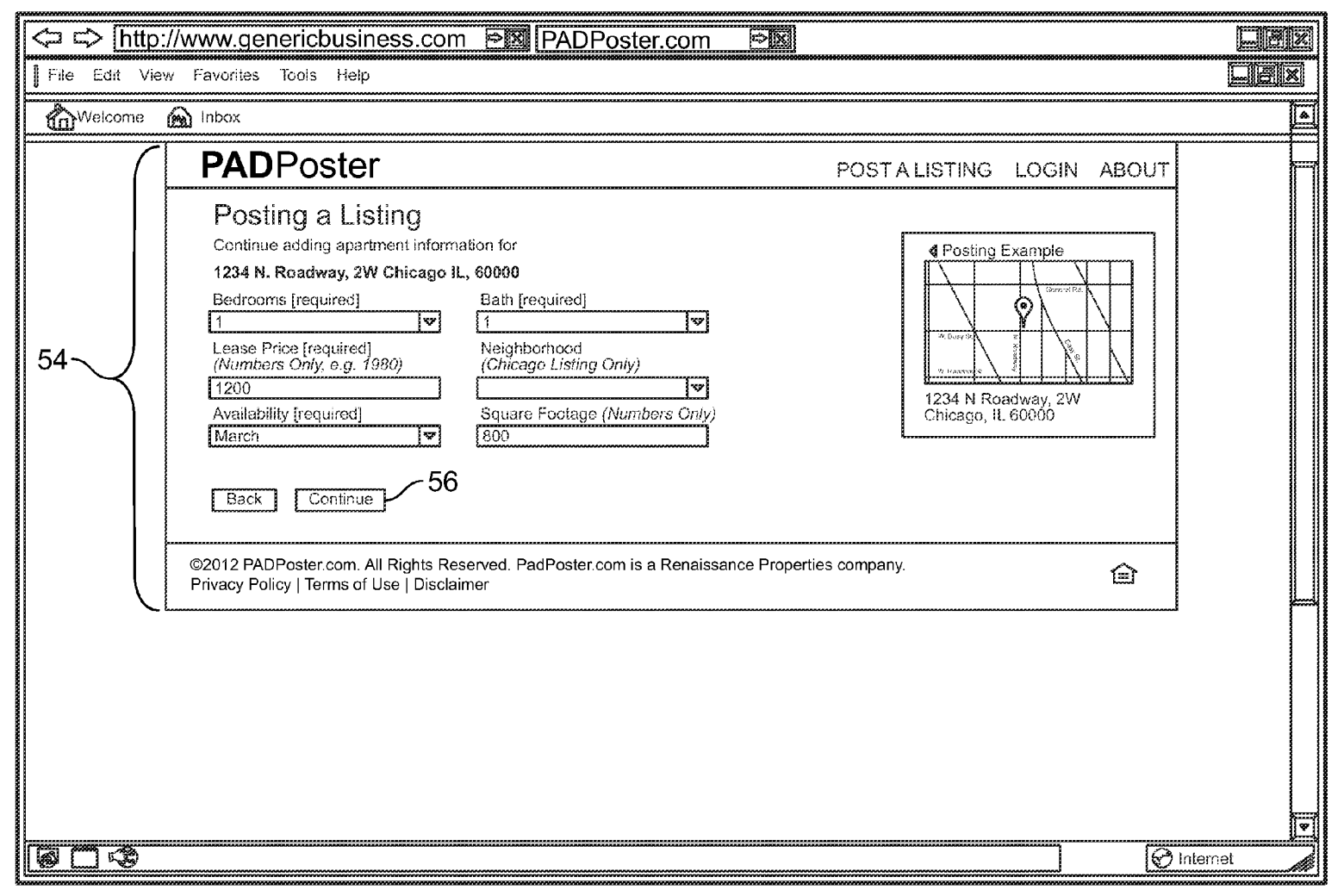

Once the address is validated, the person posting the apartment listing can enter the general apartment characteristics. FIG. 2B shows a data entry form for general apartment characteristics 54. The person listing the apartment (apartment poster) can fill in the number of bedrooms, number of bathrooms, the lease price, the neighborhood if in a large metropolitan area, the month available, and the square footage. In other embodiments, other information may be entered. Once the relevant data entry is completed, the apartment poster may select the "Continue" button 56 and the data in the data entry form for general apartment characteristics 54 will become part of the electronic record relating to the apartment that will be stored in the database.

FIG. 2C shows a data entry form for entering specific apartment characteristics 58, which includes a description box 60, where the apartment poster may enter text describing the apartment, a set of characteristic checkboxes 62, where the apartment poster may check boxes that identify characteristics of the apartment, and a "Continue" button 56. Once the description box 60 is completed, if used, and the relevant attributes in the set of characteristic checkboxes 62 are selected, if used, the apartment poster may select the "Continue" button 56 and the data in the data entry form for entering specific apartment characteristics 58 will become part of the electronic record relating to the apartment that will be stored in the database.

Figure 2D:
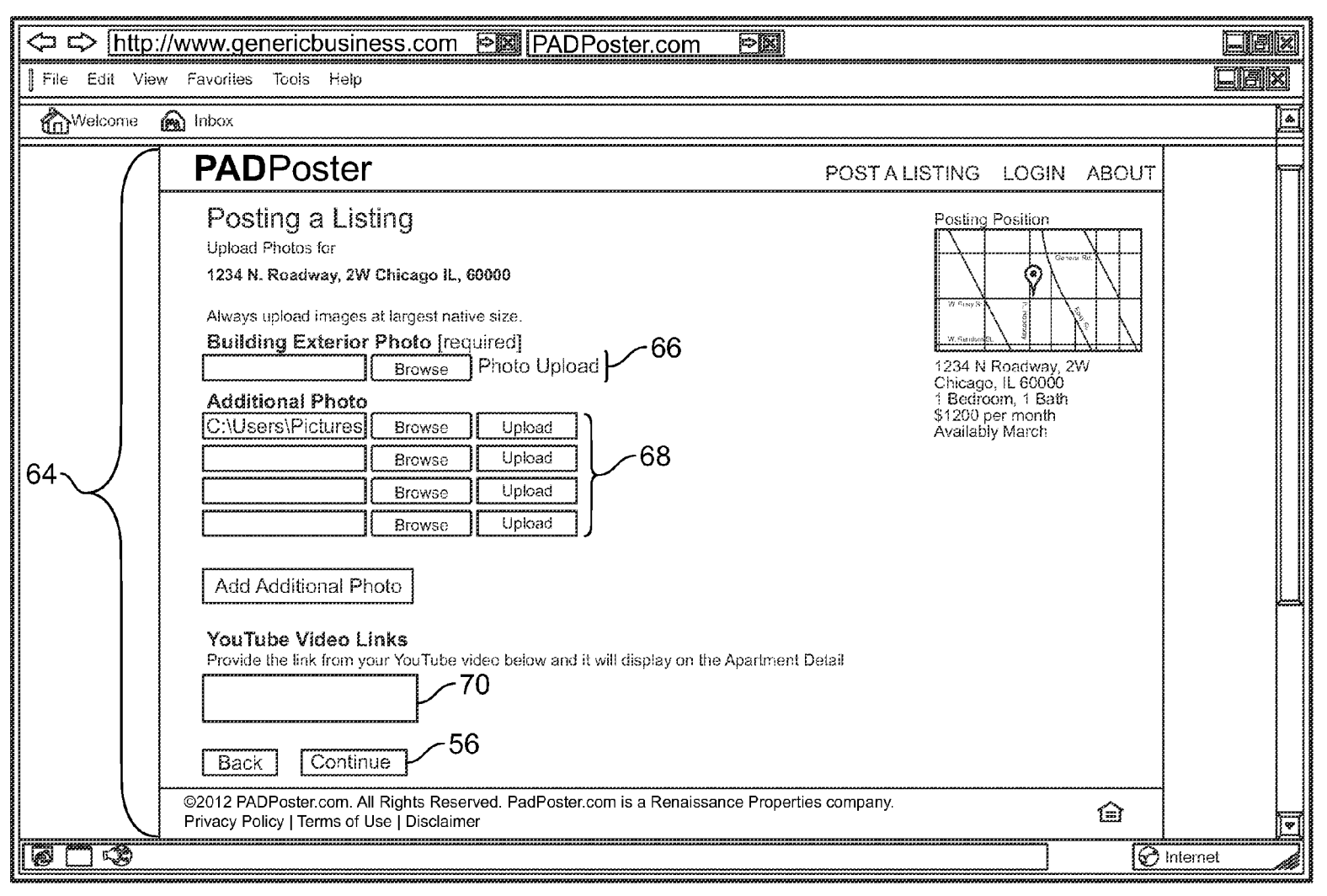

FIG. 2D shows a data entry form for entering media 64, which includes a building exterior photo selection section 66, where the apartment poster may enter the location on the computer of a photo of the exterior of the apartment building, an additional photos selection section 68, where the apartment poster may enter the location on the computer of additional photos of the interior or exterior of the apartment, and a video selection section 70, where the apartment poster may enter the location on the computer of videos to display to a prospective tenant. Once the data entry form for entering media 64 is completed, if used, the apartment poster may select the "Continue" button 56 and the data in the data entry form for entering media 64 will become part of the electronic record relating to the apartment that will be stored in the database.

Figure 2E:
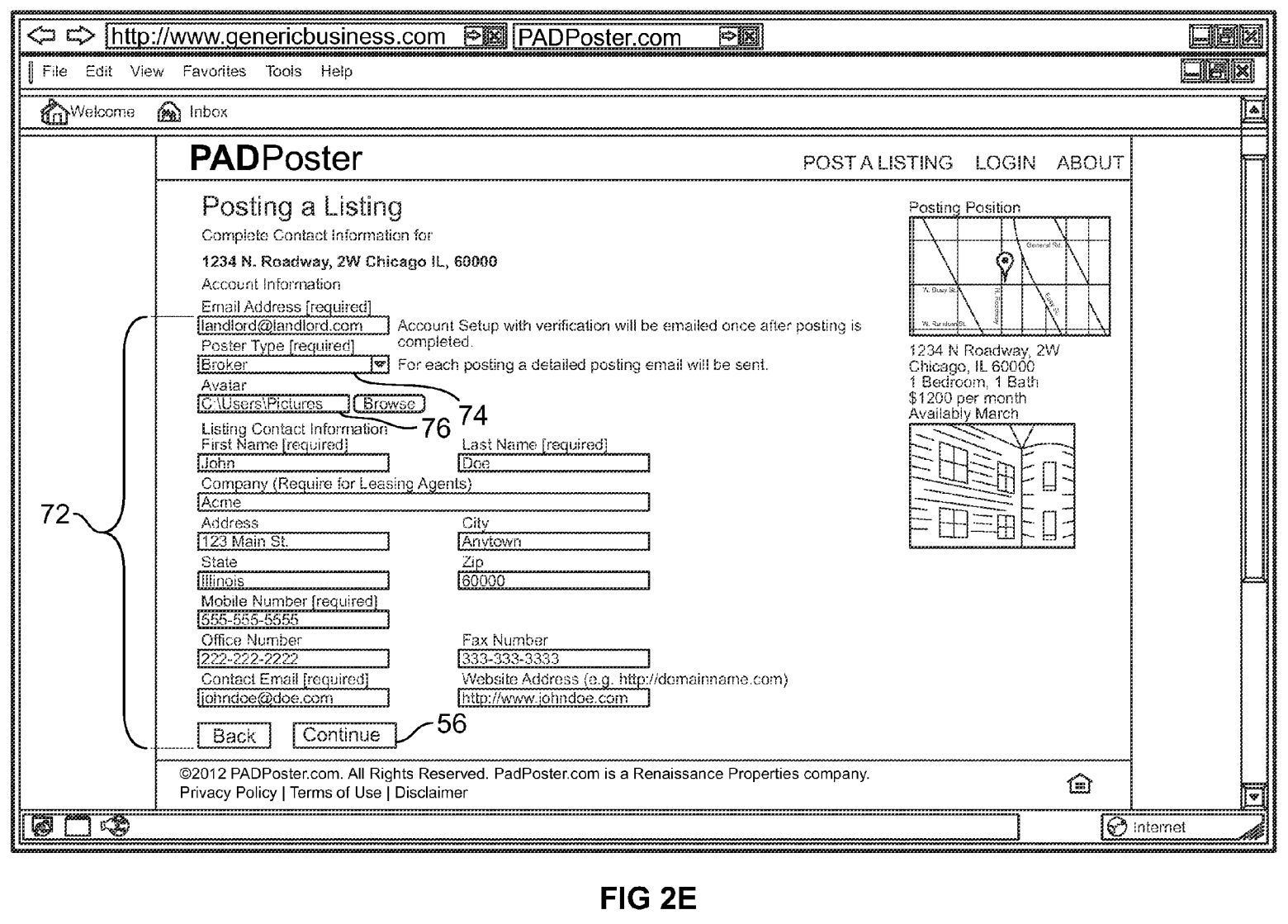

FIG. 2E shows a data entry form for entering contact information 72. This form requests general contact information from the apartment poster, including email contacts, mailing address information and telephone number information. This form also has a poster type selection 74, which, in the described embodiment, includes "Landlord", "Broker" and "Agent", although other choices may be used. This form further has an avatar selection 76, which, in the described embodiment, allows for the entry of photos, although other choices may be used. Once the data entry form for entering contact information 72 is completed, if used, the apartment poster may select the "Continue" button 56 and the data in the data entry form for entering contact information 72 will become part of the electronic record relating to the apartment that will be stored in the database.

In the described embodiments, the electronic record relating to the apartment that will be stored in the database will be completed after the steps described with reference to FIG. 2E. At this point, depending on the user defined prioritization schema and the limit identifier, the record comparer may communicate with the user input interface and the database to determine if an electronic record for the specified rental property already exists. If so, then the limit identifier is checked to see if permanently storing the newly created record in the database will cause the number of electronic records identifying that rental apartment to exceed the limit identifier. If so, then, in one embodiment, the prioritization schema is used to see if the newly created record in the database will supersede an existing record or be deleted. For example, if the limit identifier is set to 1 and the newly created record is the second listing for a particular rental property, then the prioritization schema is used to determine if the newly created record is deleted or if it supersedes an existing record. If the prioritization schema is used in the described embodiment, then a characteristic such as poster type selection 74 may be used to determine preference. That is, a landlord's newly created record may supersede a broker's existing record. The rules for determining how the limit identifiers and the prioritization schema are used are programmable by the administrator of the described system. In the described embodiment, conflicts between apartment posters may also be resolved by sending emails to the apartment posters to allow them to resolve the conflict without the use of the prioritization schema.

In another embodiment, the limit identifier and the prioritization schema may also be used to store all created electronic records in the database and to decide preferences for displaying the records during a search. For example, even if a particular address already has an associated electronic record, and an apartment poster creates a different electronic record for that same address, both electronic records will be saved in the database. Thus, a multiplicity of electronic records may exist for the same address. In this embodiment, the prioritization schema and the limit identifier may be used to filter apartments to be listed based on various criteria stored as fields in the electronic record, such as rank based on poster status (e.g. landlord, broker, or agent), date of posting, whether the apartment poster is a preferred poster and whether the listing may be auctioned, among other criteria.

In some embodiments, the output from the address validation system may be used to prevent the database from containing electronic records with inaccurate and unwanted data. An example is aided by an explanation of the DPV™ system. The Postal Service DPV™ database is essentially a "yes/no" table for checking the validity of any known individual house, apartment, P.O. box, rural box, mail drop, or commercial address that receives mail. The DPV database is included on the ZP4 DVD-ROM to allow enhanced address validation beyond what's possible when only the ZIP+4 ™ database is used. Without DPV, the ZIP+4 database is only capable of confirming whether addresses fall within the "low to high" address ranges specified in ZIP+4 records. For example, "100 to 198 (even) MAPLE AVE" is a typical house number range listed in the ZIP+4 database, and any even house number in that range will match that ZIP+4 record, whether or not the address is a valid Postal Service delivery point. With DPV, ZP4 can confirm whether any individual address is a valid delivery point, regardless of what the ZIP+4 database range implies. For example, only three addresses might actually exist in a given range like "100 to 198 (even)". Using DPV, ZP4 will validate the three known addresses and reject any other address in the range. In other words, with just a ZIP+4 database, one can only determine a candidate ZIP+4 for an address. But since the ZP4 product includes both ZIP+4 and DPV databases, one can also determine whether the address is a valid delivery point and produce valid ZIP+4 codes. In addition to allowing ZP4 to return a "yes/no" indication for any specific mailing address, DPV also allows ZP4 to detect if an address is a Commercial Mail Receiving Agency (a "mail drop" that rents mail boxes), or if an address is vacant.

As mentioned, the output from the address validation system may be used to prevent the database from containing electronic records with inaccurate and unwanted data. For example, if the commercial address validation service outputs an indication that an address is invalid, then a database filter will flag the electronic record with an indication that the address is invalid. The indication may be related to contact information of an apartment poster and the system may be monitored for individual posters who create multiple bad listings. Thus, an individual poster who clutters the database with bad data may be prevented from doing so.

Figure 3:
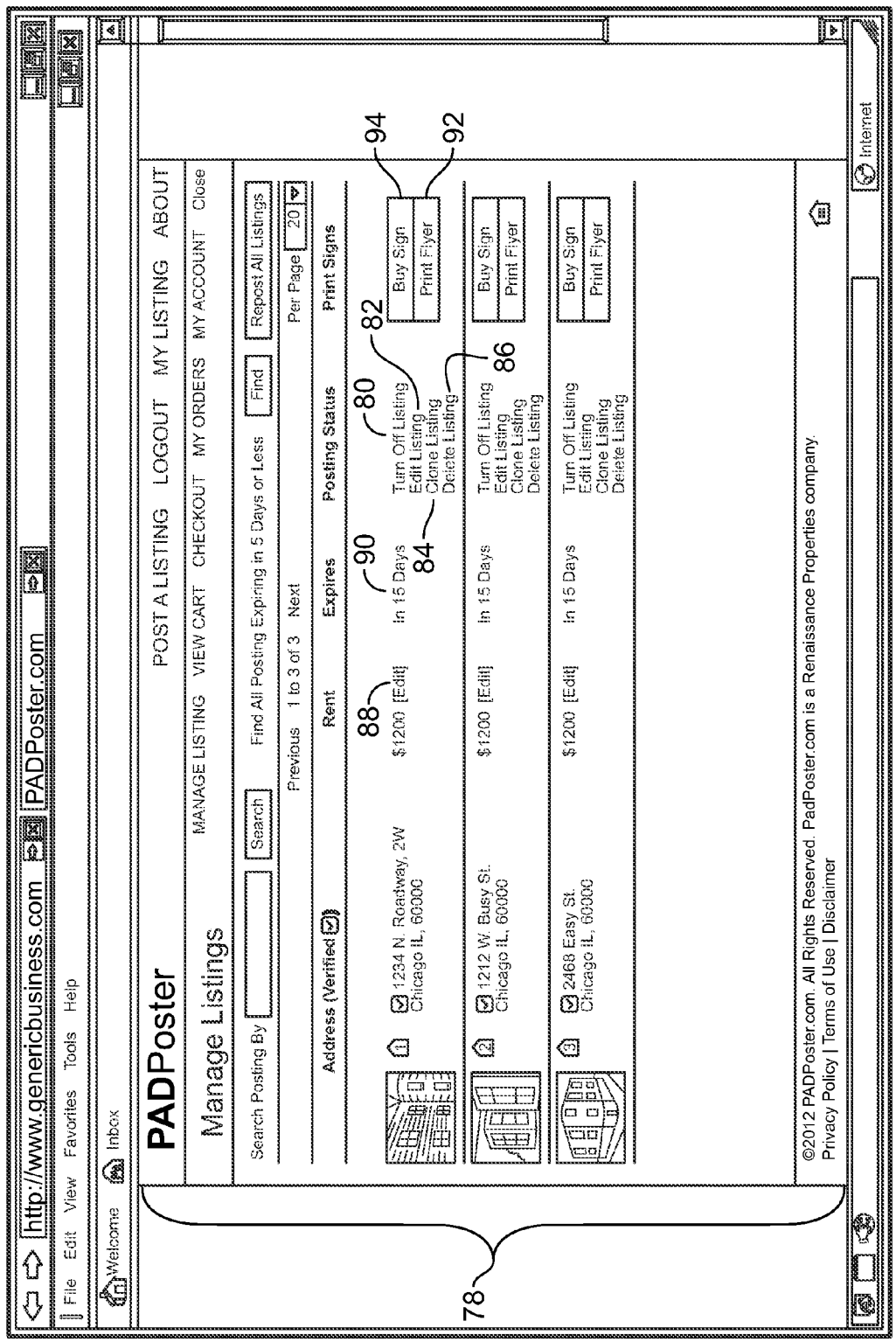
FIG. 3 shows an interface for managing electronic records.

FIG. 3 shows an interface for managing electronic records 78. Once the apartment poster has created a database of electronic records, which relate to rental apartments in the described embodiment, then he or she may manage the database using the interface for managing electronic records 78. The turn off listing selection 80 may be selected to keep the listing in the database but to prevent prospective renters from seeing the listing. The edit listing selection 82 may be used to edit the listing in a manner such that a single field in the electronic record, or listing, may be accessed with a single user input signal, such as a mouse click, and edited. Often, two different records are similar. The clone listing selection 84 may be used to create a duplicate of an apartment listing with a single mouse click. Then, again, the edit listing selection 82 may be used to change only the fields that need changing. To delete a listing for an apartment that has been rented or is no longer available, the apartment poster may use the delete listing selection 86 to delete the electronic record relating to the unavailable listing from the database. Because the rent amount is the most commonly changing attribute of an apartment listing, in the described embodiment, an edit rent selection 88 may be used for single click editing. Also in the described embodiment, an expiration date selection 90 is used to alert the apartment poster of how much time remains before the apartment listing expires. This configuration prevents the database from having to maintain out of date, unused listings. In the described embodiment, an email may be timely sent to the poster of the listing that is going to expire to remind the poster to update the listing.

In the described embodiment, the interface for managing electronic records 78 provides a print flyer button 92 that, when selected, allows the apartment poster to print a promotional flyer with relevant information from the electronic record. Additionally, a buy sign button 94 when selected allows the apartment poster to create a "For Rent" sign created by the sign generator and the output subsystem mentioned earlier.

Figure 4A:
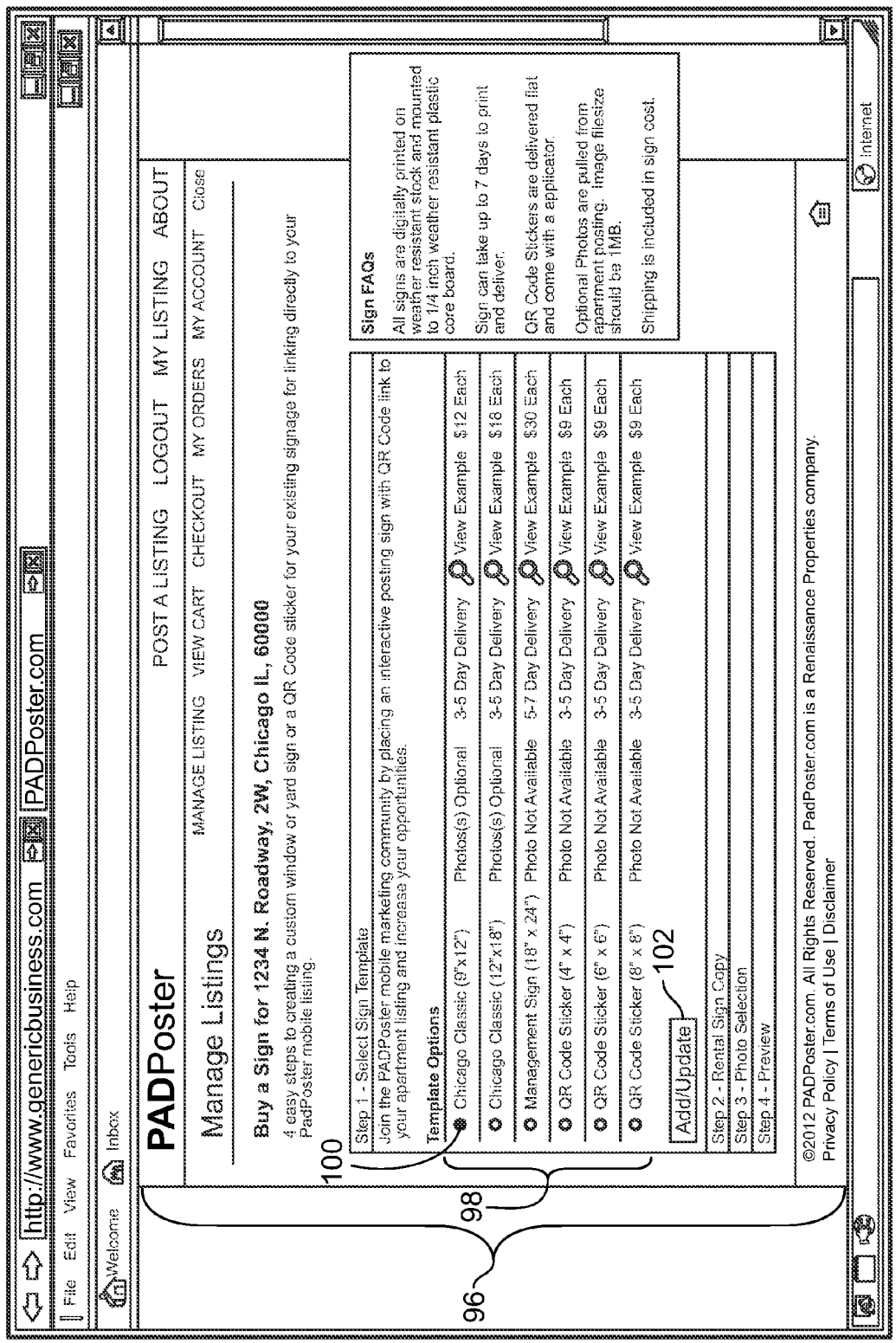
FIG. 4A shows an interface for selecting a sign template.
Figure 4B:
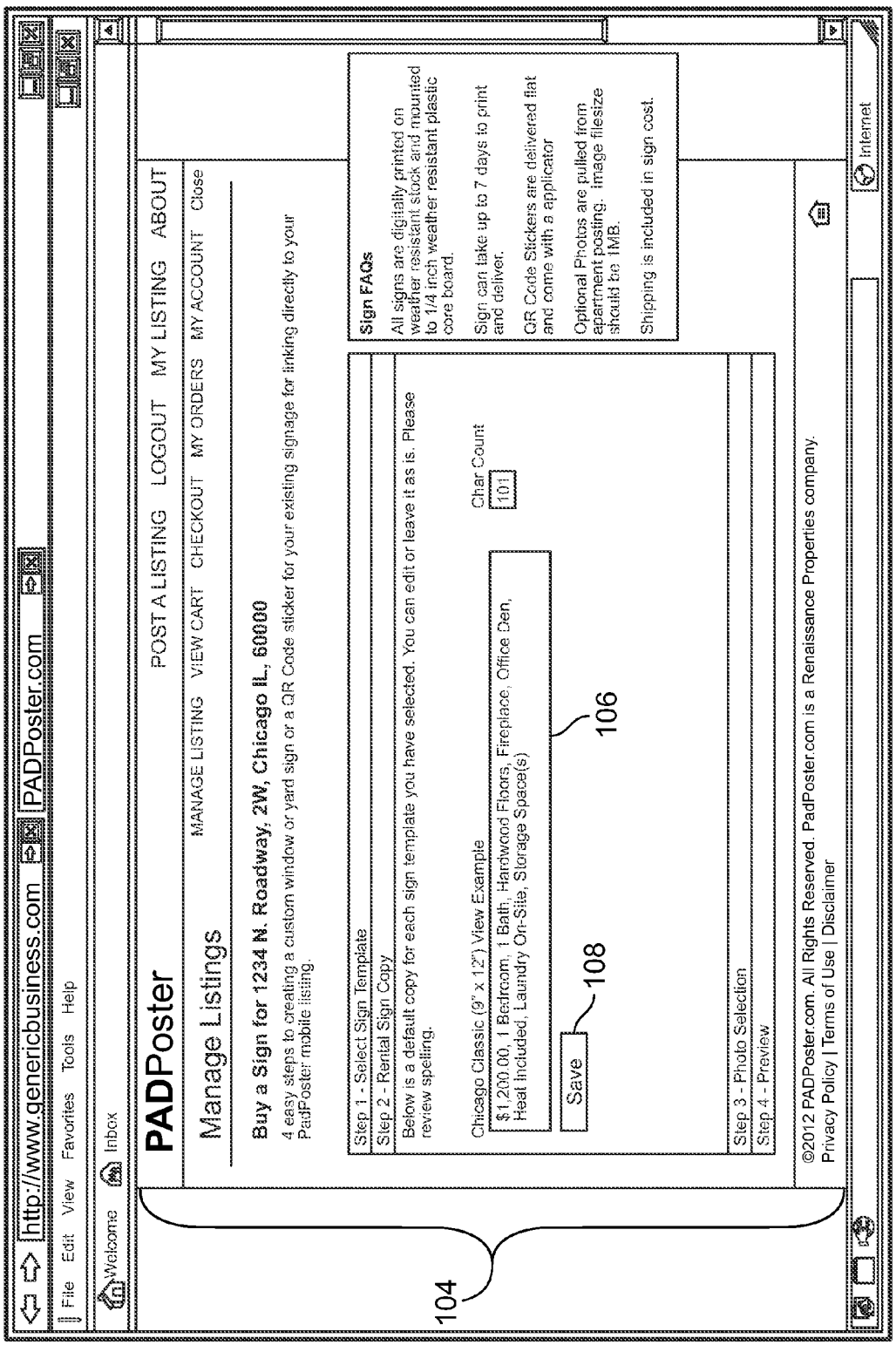
FIG. 4B shows an interface for showing and editing sign information.
Figure 4C:
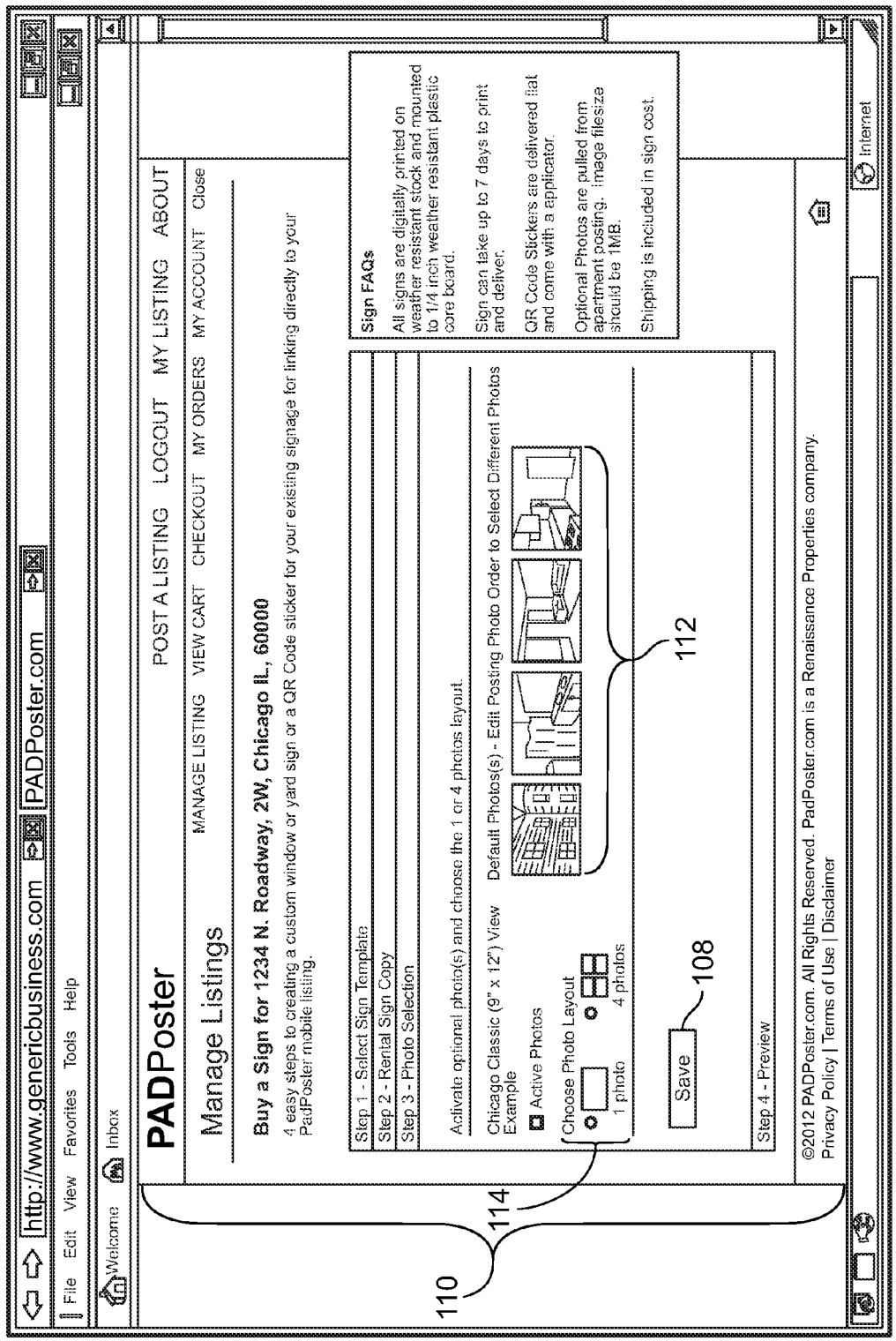
FIG. 4C shows an interface for selecting photos and layout.
Figure 4D:
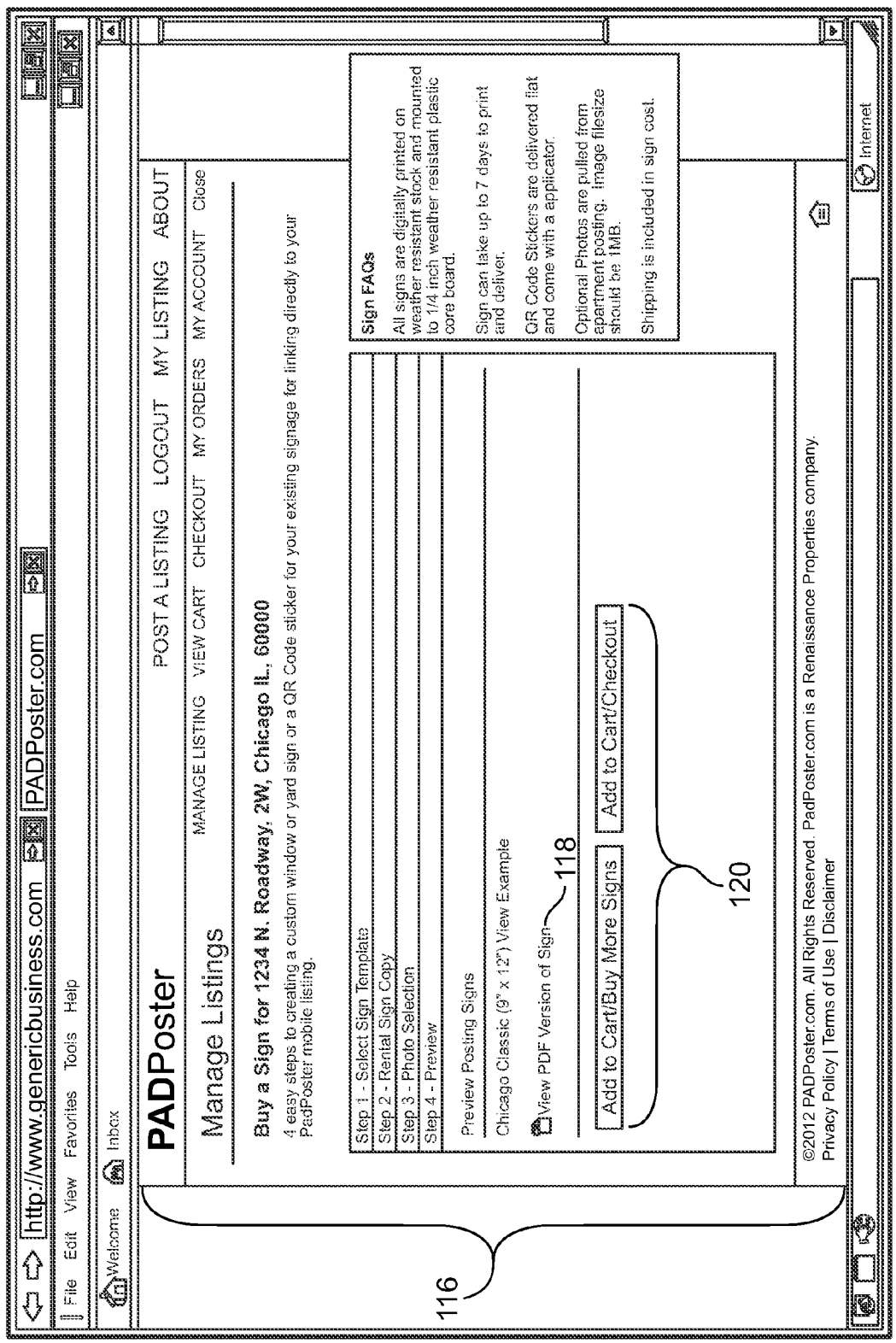
FIG. 4D shows an interface for previewing a sign.

FIG. 4A shows an interface for selecting a sign template 96, which appears once the buy sign button 94 is selected. With a single mouse click, the apartment poster may choose the type of sign to purchase by choosing one of the template options 98. In the described embodiment, the selected template 100 is a 9"×12" "For Rent" sign that will be delivered in 3 to 5 days for $12. The Add/Update button 102 is selected to order the sign and move to the next step in creating the sign. FIG. 4B shows an interface for showing and editing sign information 104. On this screen, rental sign text 106 may be added and will appear on the body of the printed sign. Once the text is complete, the apartment poster may select the save button 108 to save the text and proceed to select photos and layout. FIG. 4C shows an interface for selecting photos and layout 110. In this interface, the apartment poster may use the edit photo selection 112 and the choose photo layout 114 to determine which photos will appear on a printed sign and how the photos will be arranged. Once the apartment poster is satisfied with the photo layout, the save button 108 is selected to preview the sign that will be printed. FIG. 4D shows an interface for previewing a sign 116. The preview button 118 may be selected to view a PDF version of the sign that can be printed. If the apartment poster is satisfied with the way that the PDF version looks, he or she can select one of the add to cart buttons 120 to pay for and print the sign. Formats other than PDF may be used.

Figure 5:
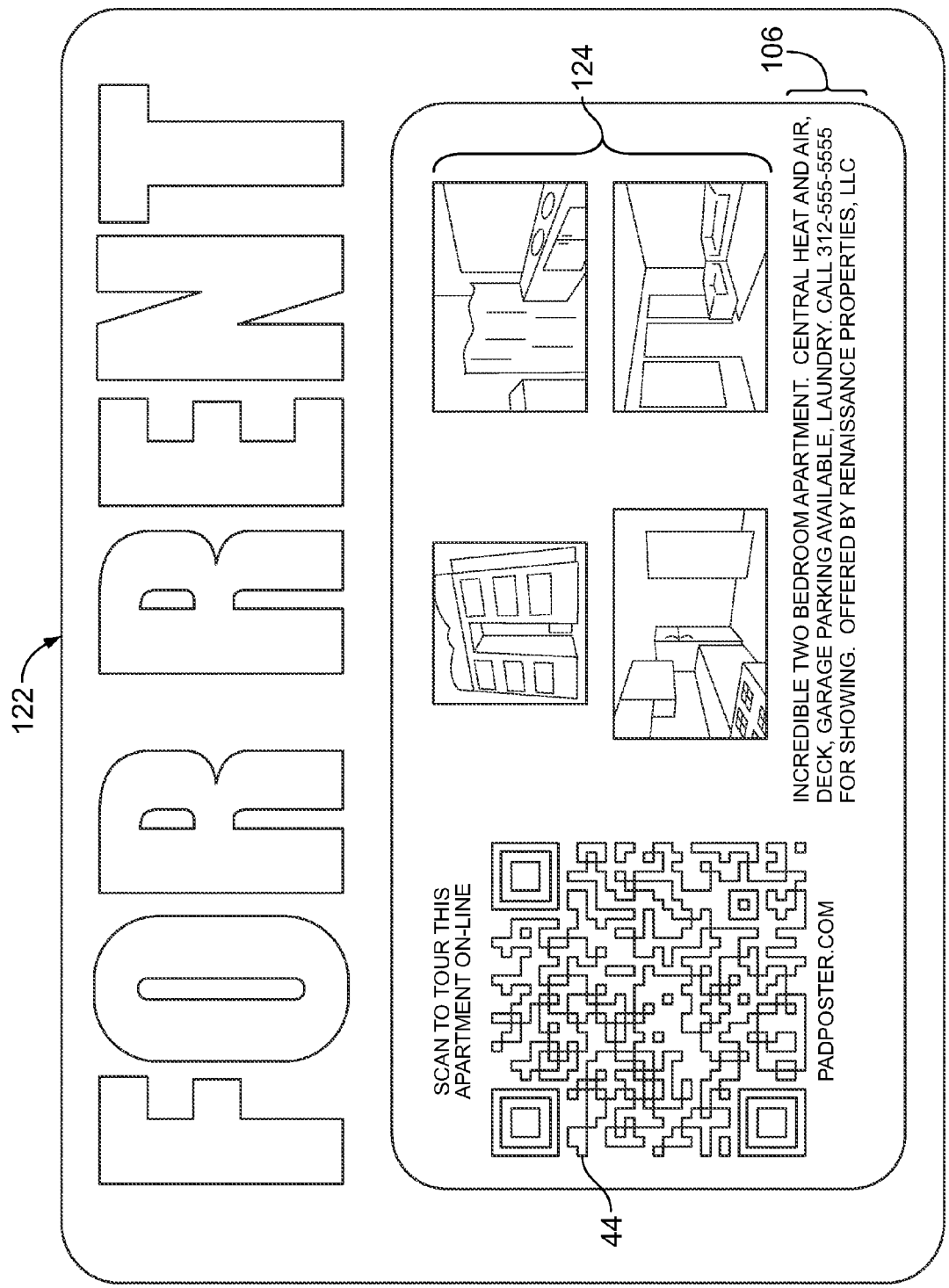
FIG. 5 shows a sample for rent sign.

FIG. 5 shows a sample "For Rent" sign 122. This "For Rent" sign 122 is a traditional design with the addition of rental sign text 106, listed apartment photos 124 and a QR code 44. In the described embodiment, a landlord, broker or agent may hang the sign in a traditional location, such as the building where the rental unit is located, or in a high traffic area where prospective renters may pass. When a prospective renter sees the sign, he or she may review the listed apartment photos 124 and the rental sign text 106. If the prospective renter wishes to see more, he or she may use a smartphone to scan or take a picture of the QR code 44. After the QR code 44 is scanned, a website relating to the rental apartment will appear on the prospective renter's smartphone. The website may provide more photos, a virtual tour using video and other information. The other information may include, but not be limited to, landlord evaluations, how to check water pressure, heat, electrical systems, who to call in an emergency, heat and electrical cost disclosure, etc.

Although the listed apartment photos 124 on the "For Rent" sign 122 and on the website may appear small, the system may keep the originally scanned photos in the original size for later use. That is, both the apartment poster and the prospective tenant may desire to print copies of the photos that appear on the "For Rent" sign 122 and on the website. However, these photos have likely been reduced in size to fit on the "For Rent" sign 122 and the website and will have lower resolution that the originally scanned photo. If the apartment poster and the prospective tenant try to print a larger size image of the modified photo, the result may be an unclear or low quality image. To solve this problem, in the described embodiment, the original image of the scanned photo will be stored as a field in the electronic record in the database. Additionally, the modified version of the photo will be stored as a different field in the electronic record. Thus, for example, when one wishes to print the photo appearing on the website in large format, the originally scanned image will be used to reproduce the image. This concept may be extended to other forms of media.

Figure 6C:
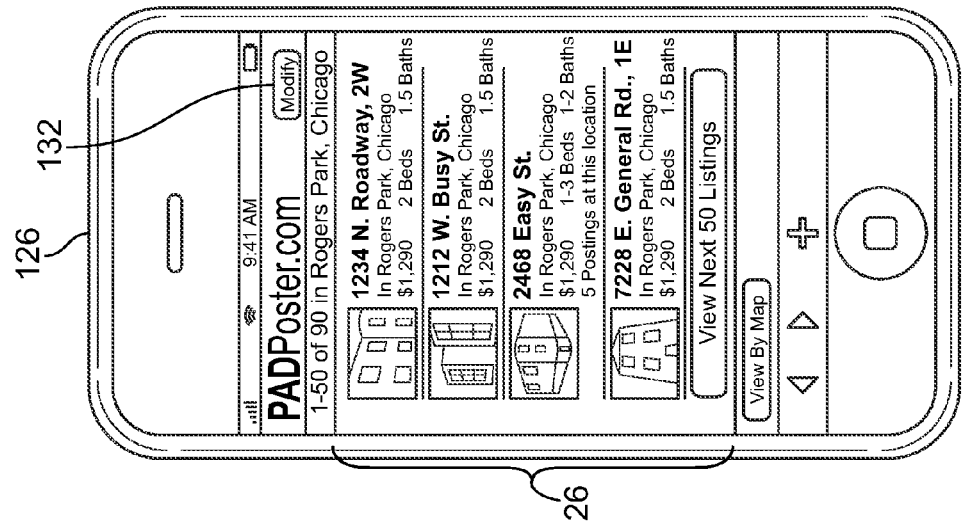
FIG. 6C shows a search results list for a search of the database using a mobile electronic device.
Figure 6B:
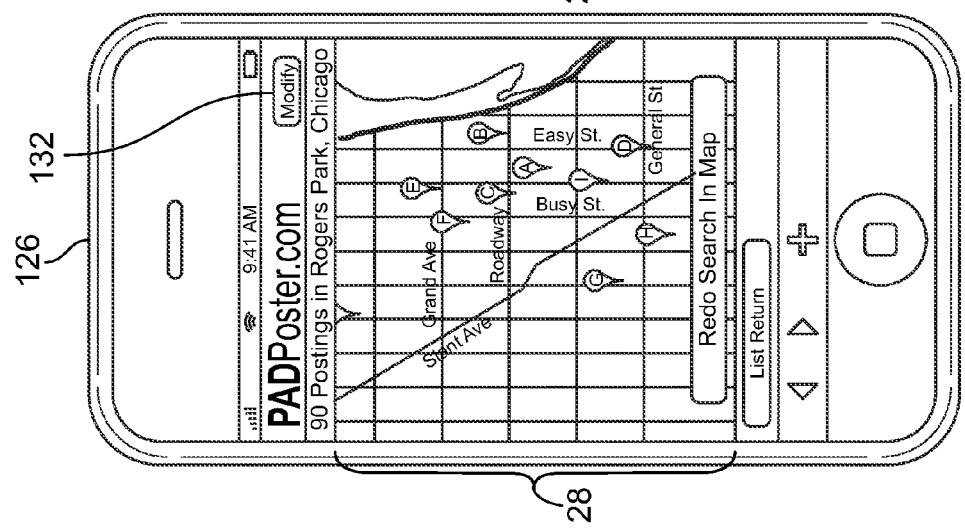
FIG. 6B shows a search results map for a search of the database using a mobile electronic device.
Figure 6A:
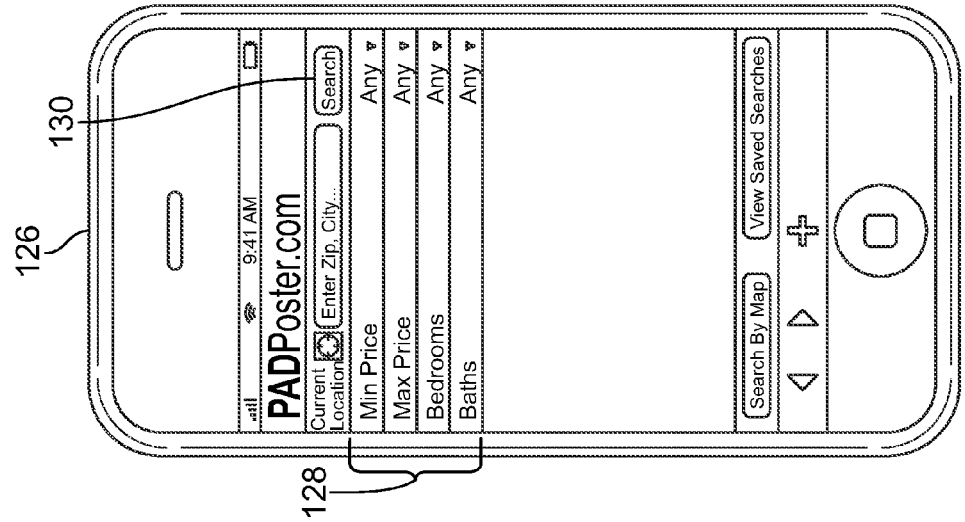
FIG. 6A shows an interface for searching the database using a mobile electronic device.

FIGS. 6A-6F show how the web pages in the described embodiment will appear on a mobile electronic device 126 when the QR code 44 is scanned from the "For Rent" sign 122. FIG. 6A shows an interface for searching the database using a mobile electronic device 126. The search criteria 128 are selected via drop-down menus and the search is processed when the search button 130 is selected. FIG. 6B shows a search results map 28 for a search of the database using a mobile electronic device 126. The prospective renter may select the modify button 132 to modify the search. FIG. 6C shows a search results list 26 for a search of the database using a mobile electronic device 126. Again, the prospective renter may select the modify button 132 to modify the search. FIG. 6D shows the rental sign text 106 from an electronic record on a webpage as displayed on a mobile electronic device 126. In the described embodiment, this appears when a single search result is selected. Once more, the prospective renter may select the modify button 132 to modify the search from this screen. If the prospective renter selects the call now button 134, the apartment poster's phone number will be dialed. If the prospective renter selects the send text button 136 or the send email button 138, the screen in FIG. 6E will appear. FIG. 6E shows a data entry form for entering contact information 140 on a mobile electronic device 126. Once the prospective tenant completes the data entry form for entering contact information 140, the apartment poster will be sent a text or an email, respectively, showing the prospective renter's interest. FIG. 6F shows the physical output of a photo from an electronic record 142 on a webpage as displayed on a mobile electronic device 126. The send text button 136 or the send email button 138 may also be used from this screen.

Figure 7:
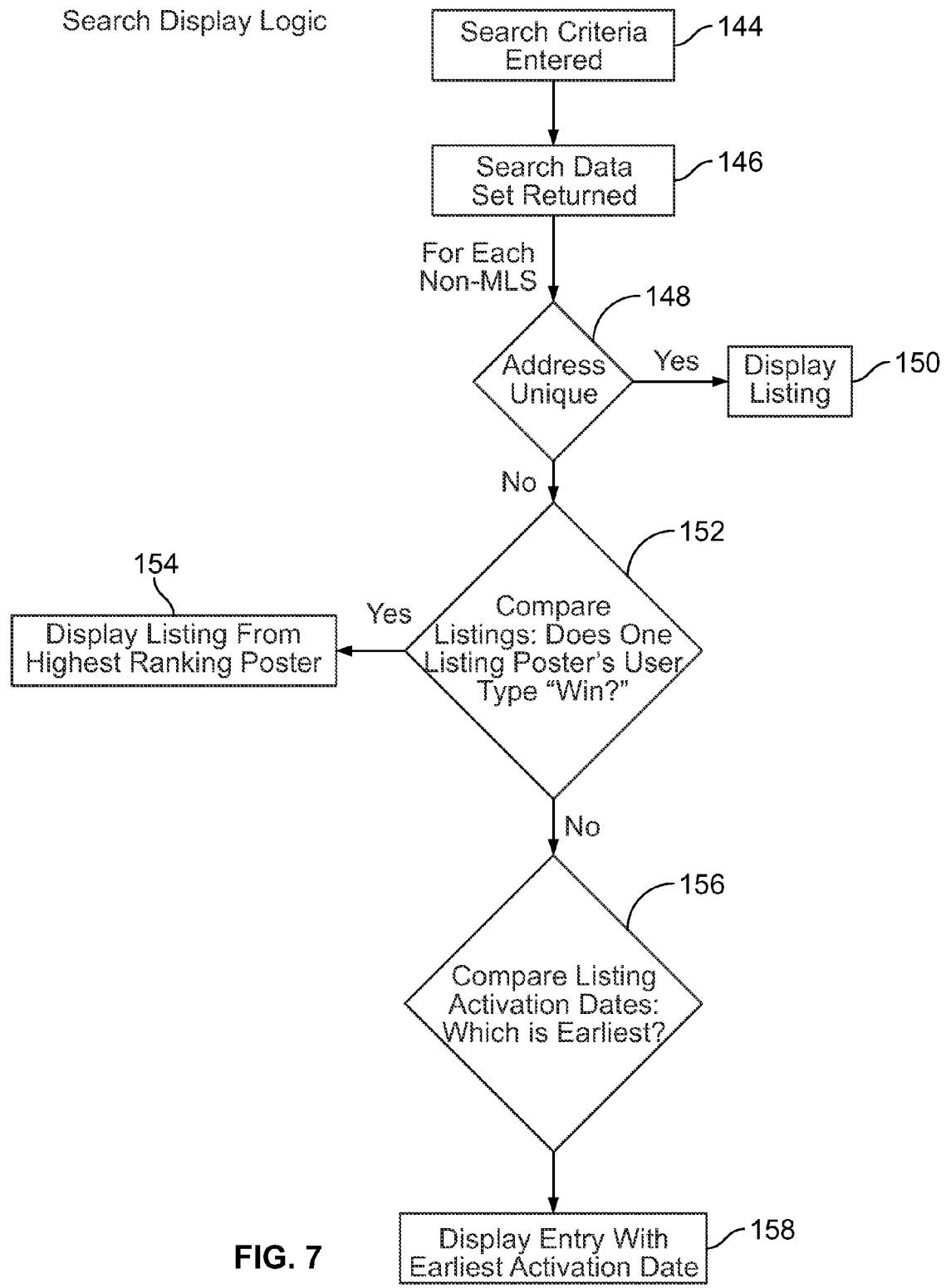
FIG. 7 shows search display logic for one embodiment.

FIG. 7 shows search display logic for one embodiment. In step 144, the search criteria are entered by the end user, usually a prospective tenant or someone else interested in the market for rental properties. In step 146, the system returns a search data set of electronic records matching the search criteria. For example, the search criteria may be all apartments costing between one thousand dollars and two thousand dollars with one bedroom and one bathroom in a particular neighborhood, and the results include all the electronic records for matching apartments, even if there is more than one electronic record per apartment. In step 148, the system evaluates all electronic records with non-MLS data and decides if there is more than one electronic record per rental apartment. If not, then, in step 150, the listing is a unique listing for a given property and the electronic record for that property is displayed in the search results list. If the search returns more than one electronic record for a particular property, then, in step 152, the apartment listings in the electronic records are compared based on who created the records, and it is decided if one record creator has priority over another. For example, if two listings exist for a particular property, one created by a landlord and one created by an agent, then the landlord may have priority, and the landlord's listing will be displayed as shown in step 154. If however, both listings were created by agents, then step 156 compares the activation dates of the electronic records. In step 158, the record with the earliest activation date is displayed. These comparisons are accomplished by a record comparer in communication with the user input interface and the database that compares electronic records. In the above example, the system set the limit identifier to one and was instructed to only allow one record per property and the prioritization schema placed landlords over agents. These preferences may be programmable.

While the present inventions have been illustrated by a description of various embodiments and while these embodiments have been set forth in considerable detail, it is intended that the scope of the inventions be defined by the appended claims. It will be appreciated by those skilled in the art that modifications to the foregoing preferred embodiments may be made in various aspects. It is deemed that the spirit and scope of the inventions encompass such variations to be preferred embodiments as would be apparent to one of ordinary skill in the art and familiar with the teachings of the present application.

What is claimed is:

1. A system of electronic records and corresponding valid records code generation for advertising and marketing an item comprising:
   a user input interface for creating electronic records that define the advertised and marketed item and to set a limit identifier to limit the number of electronic records that describe a single item and define a prioritization schema to determine the prioritization of duplicate electronic records;
   a database in communication with the user input interface for storing one or more electronic records created with the user input interface;
   a record comparer in communication with the electronic records and the database that compares one or more fields input into the electronic records using a database filter and a field checking subsystem that validates fields using a validation service to prevent inaccurate data; the limit identifier and the prioritization schema configured for use with the record comparer to accept user input instructing limitations on the number of electronic records that relate to the same item using the prioritization schema and the limit identifier to limit the number of end user searchable electronic records according to the prioritization schema and the limit identifier, to store valid electronic records in the database for user control of all valid electronic records limitations and prioritizations, and to output one of what is stored in a valid field and an electronic records flag with an indication of an invalid field to limit data input into the electronic records; and
   a code generator in communication with the database that generates an electronic code associated with a single valid record in the database.

2. The system recited in claim 1 further comprising:
   a sign generator in communication with the database and the code generator that creates an electronic sign comprising:
      an electronic record from the database;
      the electronic code associated with the electronic record from the database; and
      user defined content and layout information in electronic form; and
   an output subsystem that reproduces a physical version of the electronic sign comprising the combination of a physical version of the electronic record from the database, a physical version of the electronic code associated with the electronic record of the database and a physical version of the user defined content and layout information; and
   a mobile electronic device comprising:
      a display;
      a camera for capturing an image of the physical version of the electronic code;
      a first application that translates the image of the physical version of the electronic code into an electronic identifier that identifies the electronic record in the database associated with the electronic code; and
      a second application in communication with the first application wherein the second application takes the electronic identifier as input and outputs content from the electronic record onto the display.

3. The system recited in claim 1 wherein the user input interface allows duplication of an electronic record with a single user input signal and wherein a single field in the electronic record may be accessed with a single user input signal and edited.

4. The system recited in claim 1 wherein the electronic code is a matrix barcode.

5. The system recited in claim 1 wherein the electronic record includes at least one of audio, a still image, and video related to the item and wherein the original of the at least one of the audio, the still image, and the video is stored as a field in the electronic record.

6. The system recited in claim 2 wherein the electronic identifier is an internet address.

7. The system recited in claim 2 further comprising a third application on the mobile electronic device that translates space-based satellite navigation system data into an electronic identifier that identifies the electronic record in the database relating to the nearest item.

8. The system recited in claim 2 further comprising a search engine that allows a user of the mobile electronic device to search the database based on user-selectable criteria.

9. A system of electronic records and corresponding valid records code generation for advertising and marketing rental apartments comprising:
- a user input interface for creating electronic records that define the advertised and marketed rental apartment and to set a limit identifier to limit the number of electronic records that describe a single item and define a prioritization schema to determine the prioritization of duplicate electronic records;
- a database in communication with the user input interface for storing one or more electronic records created with the user input interface;
- a record comparer in communication with the electronic records and the database that compares one or more fields input into the electronic records using a database filter and a field checking subsystem that validates fields using a validation service to prevent inaccurate data;
- the limit identifier and the prioritization schema configured for use with the record comparer to accept user input instructing limitations on the number of electronic records that relate to the same rental apartment using the prioritization schema and the limit identifier to limit the number of end user searchable electronic records according to the prioritization schema and the limit identifier, to store valid electronic records in the database for user control of all valid electronic records limitations and prioritizations, and to output one of what is stored in a valid field and an electronic records flag with an indication of an invalid field to limit data input into the electronic records; and
- a code generator in communication with the database that generates an electronic code associated with a single valid record in the database.

10. The system recited in claim 9 further comprising:
- a sign generator in communication with the database and the code generator that creates an electronic sign comprising:
  - an electronic record from the database;
  - the electronic code associated with the electronic record from the database; and
  - user defined content and layout information in electronic form; and
- an output subsystem that reproduces a physical version of the electronic sign comprising the combination of a physical version of the electronic record from the database, a physical version of the electronic code associated with the electronic record of the database and a physical version of the user defined content and layout information; and
- a mobile electronic device comprising:
  - a display;
  - a camera for capturing an image of the physical version of the electronic code;
  - a first application that translates the image of the physical version of the electronic code into an electronic identifier that identifies the electronic record in the database associated with the electronic code; and
  - a second application in communication with the first application wherein the second application takes the electronic identifier as input and outputs content from the electronic record onto the display.

11. The system recited in claim 9 wherein the user input interface allows duplication of an electronic record with a single user input signal and wherein a single field in the electronic record may be accessed with a single user input signal and edited.

12. The system recited in claim 9 wherein a field in the electronic record is an address of an apartment and further comprising an address checking subsystem that validates the address using a commercial address validation service and that outputs one of a valid address and an indication that the address is invalid.

13. The system recited in claim 9 wherein the user input interface creates electronic records using Multiple Listing Service or other Real Estate Transaction Standard data.

14. The system recited in claim 9 wherein the electronic record includes at least one of audio, a still image, and video related to the rental apartment and wherein the original of the at least one of the audio, the still image, and the video is stored as a field in the electronic record.

15. The system recited in claim 10 wherein the electronic code is a QR code and wherein the electronic identifier is an internet address.

16. The system recited in claim 10 further comprising a third application on the mobile electronic device that translates space-based satellite navigation system data into an electronic identifier that identifies the electronic record in the database relating to the nearest rental apartment.

17. The system recited in claim 10 further comprising a search engine that allows a user of the mobile electronic device to search the database based on user-selectable criteria.

18. The system recited in claim 12 further comprising a database filter that flags electronic records with an indication that the address is invalid.

19. A method for creating electronic records and corresponding valid records code generation for advertising and marketing an item comprising:
- creating electronic records that define the advertised and marketed item through a user input interface;
- setting a limit identifier through the user input interface to limit the number of electronic records that describe a single item;
- defining a prioritization schema through the user input interface to determine the prioritization of duplicate electronic records;
- storing one or more electronic records created with the user input interface in a database that is in communication with the user input interface;
- comparing one or more fields input into the electronic records using record comparer that uses a database filter and a field checking subsystem that validates fields using a validation service to prevent inaccurate data;
- configuring the limit identifier and the prioritization schema for use with the record comparer and accepting user input instructing limitations on the number of electronic records that relate to the same item using the prioritization schema and the limit identifier to limit the number of end user searchable electronic records according to the prioritization schema and the limit identifier;
- storing valid electronic records in the database for user control of all valid electronic records limitations and prioritizations;
- outputting one of what is stored in a valid field and an electronic records flag with an indication of an invalid field to limit data input into the electronic records; and
- generating an electronic code associated with a single valid record in the database using a code generator in communication with the database.

20. The method recited in claim 19 further comprising:
creating an electronic sign using a sign generator in communication with the database and the code generator comprising:
- an electronic record from the database;
- the electronic code associated with the electronic record from the database; and
- user defined content and layout information in electronic form; and reproducing a physical version of the electronic sign comprising the combination of a physical version of the electronic record from the database, a physical version of the electronic code associated with the electronic record of the database and a physical version of the user defined content and layout information using an output subsystem; and providing a mobile electronic device comprising:
- providing a display;
- providing a camera for capturing an image of the physical version of the electronic code;
- translating the image of the physical version of the electronic code into an electronic identifier that identifies the electronic record in the database associated with the electronic code using a first application; and
- taking the electronic identifier as input and outputting content from the electronic record onto the display using a second application in communication with the first application.

* * * * *